(12) United States Patent
Duvenhage et al.

(10) Patent No.: US 8,946,108 B2
(45) Date of Patent: Feb. 3, 2015

(54) SLURRY BED FISCHER-TROPSCH CATALYSTS WITH SILICA/ALUMINA STRUCTURAL PROMOTERS

(71) Applicant: Rentech, Inc., Los Angeles, CA (US)

(72) Inventors: Dawid J. Duvenhage, Evergreen, CO (US); Belma Demirel, Clarendon Hills, IL (US)

(73) Assignee: RES USA, LLC., Commerce City, CO (US)

( * ) Notice: Subject to any disclaimer, the term of this patent is extended or adjusted under 35 U.S.C. 154(b) by 0 days.

(21) Appl. No.: 14/293,893

(22) Filed: Jun. 2, 2014

(65) Prior Publication Data
US 2014/0274666 A1 Sep. 18, 2014

Related U.S. Application Data

(62) Division of application No. 12/790,101, filed on May 28, 2010, now Pat. No. 8,791,041.

(60) Provisional application No. 61/183,840, filed on Jun. 3, 2009.

(51) Int. Cl.
*B01J 21/00* (2006.01)
*B01J 21/16* (2006.01)
(Continued)

(52) U.S. Cl.
CPC ............... *B01J 21/16* (2013.01); *B01J 23/002* (2013.01); *B01J 23/78* (2013.01); *B01J 23/8946* (2013.01);
(Continued)

(58) Field of Classification Search
USPC ............... 502/74, 76, 81, 201, 244, 245, 258, 502/260, 326, 330, 331, 336, 338
See application file for complete search history.

(56) References Cited

U.S. PATENT DOCUMENTS

| 2,767,202 A | 10/1956 | Rottig |
| 5,302,622 A | 4/1994 | Chaumette et al. |

(Continued)

FOREIGN PATENT DOCUMENTS

| CN | 1593757 | 3/2005 |
| CN | 1600420 | 3/2005 |

(Continued)

OTHER PUBLICATIONS

Chinese Office Action dated Jan. 6, 2014 for corresponding Chinese Application No. 201080224394.4 (8 pgs).

(Continued)

*Primary Examiner* — Cam N. Nguyen
(74) *Attorney, Agent, or Firm* — Timothy S. Westby; Porter Hedges, LLP

(57) ABSTRACT

A structurally promoted, precipitated, Fischer-Tropsch catalyst that exhibits an RCAI-10 of 0-2.8 and/or produces less than 6 wt % fines after 5 hours ASTM Air Jet Attrition testing, due to formation via: preparing a nitrate solution by forming at least one metal slurry and combining the at least one metal slurry with a nitric acid solution; combining the nitrate solution with a basic solution to form a precipitate; structurally promoting the precipitate with at least one source of silicon to form a promoted mixture, wherein promoting comprises combining the precipitate with (a) silicic acid and one or more component selected from the group consisting of non-crystalline silicas, crystalline silicas, and sources of kaolin or (b) a component selected from the group consisting of non-crystalline silicas and sources of kaolin, in the absence of silicic acid; and spray drying the promoted mixture to produce catalyst having a desired particle size.

42 Claims, 8 Drawing Sheets

(51) Int. Cl.
| | |
|---|---|
| *B01J 29/00* | (2006.01) |
| *B01J 27/25* | (2006.01) |
| *B01J 23/40* | (2006.01) |
| *B01J 23/42* | (2006.01) |
| *B01J 23/58* | (2006.01) |
| *B01J 23/70* | (2006.01) |
| *B01J 23/72* | (2006.01) |
| *B01J 23/74* | (2006.01) |
| *B01J 23/00* | (2006.01) |
| *B01J 23/78* | (2006.01) |
| *B01J 23/89* | (2006.01) |
| *B01J 35/00* | (2006.01) |
| *B01J 35/02* | (2006.01) |
| *B01J 35/08* | (2006.01) |
| *B01J 35/10* | (2006.01) |
| *B01J 37/00* | (2006.01) |
| *B01J 37/03* | (2006.01) |
| *B01J 37/04* | (2006.01) |
| *B01J 37/08* | (2006.01) |
| *C10G 2/00* | (2006.01) |

(52) U.S. Cl.
CPC .............. *B01J 35/002* (2013.01); *B01J 35/023* (2013.01); *B01J 35/08* (2013.01); *B01J 35/1019* (2013.01); *B01J 35/1038* (2013.01); *B01J 37/0045* (2013.01); *B01J 37/031* (2013.01); *B01J 37/04* (2013.01); *B01J 37/08* (2013.01); *B01J 2523/00* (2013.01); *C10G 2/33* (2013.01); *C10G 2300/70* (2013.01)
USPC ................. 502/74; 502/76; 502/81; 502/201; 502/244; 502/245; 502/258; 502/260; 502/326; 502/330; 502/331; 502/336; 502/338

(56) References Cited

U.S. PATENT DOCUMENTS

| 5,928,983 | A | 7/1999 | Culross |
|---|---|---|---|
| 6,355,593 | B1 | 3/2002 | Daage et al. |
| 6,706,661 | B1 | 3/2004 | Krylova et al. |
| 7,199,077 | B2 | 4/2007 | Hu et al. |
| 7,915,193 | B2 | 3/2011 | Demirel et al. |
| 2002/0013375 | A1 | 1/2002 | Roy-Auberger et al. |
| 2003/0064885 | A1 | 4/2003 | Krylova et al. |
| 2004/0009871 | A1 | 1/2004 | Hu et al. |
| 2004/0122115 | A1 | 6/2004 | Espinoza et al. |
| 2004/0220437 | A1 | 11/2004 | Jothimurugesan et al. |
| 2004/0259960 | A1 | 12/2004 | Espinoza et al. |
| 2006/0096891 | A1 | 5/2006 | Stamires et al. |
| 2009/0069451 | A1 | 3/2009 | Demirel et al. |
| 2009/0075814 | A1 | 3/2009 | Duvenhage et al. |
| 2009/0111684 | A1 | 4/2009 | Demirel et al. |
| 2009/0280986 | A1 | 11/2009 | Sheppard |

FOREIGN PATENT DOCUMENTS

| CN | 1600421 | 3/2005 |
|---|---|---|
| CN | 101279260 | 10/2008 |
| JP | 2007061770 | 3/2007 |

OTHER PUBLICATIONS

Search Report and Written Opinion dated Jan. 21, 2011 for corresponding International Application No. PCT/US2010/036700 (3 pgs).
European Patent Office Search Report dated Aug. 9, 2013 for corresponding European Application No. 10783876.5 (10 pgs.).
Pham et al., "The Synthesis of Attrition Resistant Slurry Phase Iron Fischer-Tropsch Catalysts", Catalysis Today, vol. 58, No. 4, dated May 1, 2000, pp. 233-240 (8 pgs.).
Sudsakorn et al., "Preparation of Attrition-Resistant Spray-Dried Fe Fischer-Tropsch Catalysts Using Precipitated $SiO_2$", Industrial & Engineering Chemistry Research, vol. 40, No. 22, dated Oct. 1, 2001, pp. 4778-4784 (7 pgs.).
Diffenbach et al., "The Role of pH in the Performance of Precipitated Iron Fischer-Tropsch Catalysts*1", Journal of Catalysis, vol. 100, No. 2, dated Aug. 1, 1986, pp. 466-476 (11 pgs.).
Canadian Office Action dated Apr. 19, 2013 for corresponding Canadian Application No. 2,764,367 (4 pgs.).
Eurasian Office Action dated Jul. 29, 2013 for corresponding Eurasian Application No. 2011905255/28 (3 pgs.).
Australian Examination Report dated Oct. 2, 2012 for corresponding Australian Application No. 2010256838 (2 pgs.).
Notice of Allowance dated Mar. 27, 2014 for corresponding U.S. Appl. No. 12/790,101 (7 pgs.).
Office Action dated Oct. 28, 2013 for corresponding U.S. Appl. No. 12/790,101 (12 pgs.).
Office Action dated Apr. 25, 2013 for corresponding U.S. Appl. No. 12/790,101 (12 pgs.).
Office Action dated Apr. 23, 2012 for corresponding U.S. Appl. No. 12/790,101 (11 pgs.).
Office Action dated Sep. 25, 2012 for corresponding U.S. Appl. No. 12/790,101 (7 pgs.).
Chinese Office Action dated Aug. 26, 2014 for corresponding Chinese Application No. 20108024394.4 (4 pgs).

U.S. 8,946,108 B2

SLURRY BED FISCHER-TROPSCH CATALYSTS WITH SILICA/ALUMINA STRUCTURAL PROMOTERS

CROSS-REFERENCE TO RELATED APPLICATIONS

This application is a divisional application which claims the benefit under 35 U.S.C. §121 of U.S. patent application Ser. No. 12/790,101, filed May 28, 2010, which claims the benefit under 35 U.S.C. §119(e) of U.S. Provisional Patent Application No. 61/183,840, filed Jun. 3, 2009, the disclosures of each of which are hereby incorporated herein by reference.

STATEMENT REGARDING FEDERALLY SPONSORED RESEARCH OR DEVELOPMENT

Not Applicable.

BACKGROUND

1. Field of the Invention

The present invention relates generally to a catalyst for use in Fischer-Tropsch processes. More particularly, the present invention relates to a method of making a Fischer-Tropsch catalyst that exhibits enhanced structural integrity while retaining substantial catalytic activity and/or selectivity toward heavy hydrocarbons. Still more specifically, the present invention relates to a method of producing a Fischer-Tropsch catalyst containing silica and/or alumina structural promoters.

2. Background of the Invention

The Fischer-Tropsch (FT) technology is used to convert a mixture of hydrogen and carbon monoxide (synthesis gas or syngas) to valuable hydrocarbon products. Often, the process utilizes a slurry bubble column reactor (SBCR). The technology of converting synthesis gas originating from natural gas into valuable primarily liquid hydrocarbon products is referred to as Gas To Liquids (GTL) technology. When coal is the raw material for the syngas, the technology is commonly referred to as Coal-To-Liquids (CTL). The FT technology is one of several conversion techniques included in the broader GTL/CTL technology.

One of the primary difficulties encountered in using iron-based catalysts for carrying out the FT reaction in a slurry bubble column reactor (SBCR) is the breakdown of the initial catalyst particles into very small particles, i.e. less than 5 microns in size. Although the small particle size is advantageous for increasing surface area and reaction rate of the catalyst, problems arise in separating the small catalyst particles from the wax slurry medium. Separating the catalyst particles from the wax is necessary since, when operating under the most profitable conditions wherein wax is produced, removal of the wax (along with catalyst) from the reactor is required to maintain a constant height of slurry in the reactor.

There are at least three modes of iron catalyst breakdown. First, when the catalyst undergoes activation, the starting material, hematite, is converted to iron carbides which have different structures and density. The induced stresses from the transformation lead to particle breakage. Chemical attrition is associated with such structural changes during chemical transformation within the catalyst. Active phase transition from iron oxide to iron metal to iron carbide causes such chemical attrition. Second, if the reactor is operated at high temperature, e.g. greater than about 280° C., or at low $H_2$:CO ratio, e.g. less than about 0.7, carbon formation via the Boudouard reaction can pry the particles apart. Third, mechanical action can cause breakup of the particles due to catalyst particles impinging each other or the reactor walls. Physical attrition is mainly contributed to this rubbing and collision of the catalyst particles, resulting in micron sized 'fines' material. Such attrition may lead to degradation of product quality (solids and iron content in the wax product) and other undesirable impacts on the wax hydrogenation system, which is generally sensitive to the presence of iron in the feedstock. Very fine material is difficult to settle in primary wax/catalyst separation units and the presence of ultrafines will complicate secondary filtration systems.

It is impossible to determine the actual attrition resistance required without knowing the type of reactor system, the type of wax/catalyst separation system and the system operating conditions.

Heretofore, attempts at developing strengthened iron-based catalysts have focused on producing the strongest possible catalysts, regardless of the actual strength required for a particular system. Such approaches sacrifice activity and selectivity for catalyst strength which may exceed that which is required. Such work focuses on attempting to maximize strength of the catalyst without due regard for the negative impact of high levels of strengthener, e.g. silica, on activity and selectivity. Further, tests for catalyst strength have been carried out ex-situ, i.e. outside the SBCRs. Many of the tests have been conducted in a stirred tank reactor (autoclave) which subjects the catalyst to severe shearing forces not typically encountered in slurry bubble column reactors.

Improved catalyst strength can be achieved by depositing the iron on a refractory support such as silica, alumina or magnesia or by adding a structural promoter to the baseline catalyst. The challenge is to strengthen the catalyst without appreciably compromising the activity and selectivity of the catalyst. In the art, use of binders, for example, $SiO_2$ binder, has been performed at high levels, e.g. 10%-15%. These catalysts seem to undesirably yield very light Fischer-Tropsch products. Thus, although catalysts comprising silica ($SiO_2$) and alumina ($Al_2O_3$) as supports at high levels (~10%) have been disclosed in the art and some of these catalysts exhibit enhanced attrition resistance, the performance thereof has been sub-optimal with regard to products formed thereby.

Attrition of a precipitated iron catalyst promoted with copper and potassium was studied by United Catalyst (now Sud-Chemie). It was reported that the low agglomerate strength of this catalyst led to attrition on the micron scale caused by physical action on the catalyst. Phase transformations and carbon deposition that accompanied exposure of the catalyst to carbon monoxide at elevated temperatures were found to cause break-up of the catalyst particles into nano-scale carbide particles.

Accordingly, there is a need for a catalyst and a method of making same which has resistance against breakdown and also maintains desirable features of an unsupported iron catalyst, including high activity and selectivity toward high molecular weight hydrocarbons. Such a catalyst should preferably also facilitate separation of the catalyst from the reaction product.

SUMMARY

Herein disclosed is a structurally promoted, precipitated, Fischer-Tropsch catalyst that exhibits an RCAI-10 in the range of from about 0 to about 2.8, due to formation via: preparing a nitrate solution, wherein preparing comprises forming at least one metal slurry and combining the at least one metal slurry with a nitric acid solution; combining the nitrate solution with a basic solution to form a precipitate; structurally promoting the precipitate with at least one source of silicon to form a promoted mixture, wherein promoting comprises combining the precipitate with (a) silicic acid and one or more component selected from the group consisting of non-crystalline silicas, crystalline silicas, and sources of kaolin or (b) at least one component selected from the group consisting of non-crystalline silicas and sources of kaolin, in the absence of silicic acid; and spray drying the promoted mixture to produce catalyst having a desired particle size. The Fischer-Tropsch catalyst may exhibit an RCAI-20 in the range of from about 0 to about 4.3. In embodiments, the Fischer-Tropsch catalyst comprises iron, due to preparation of the nitrate solution with an iron slurry, and has a weight ratio of Fe:SiO2 in the range of from about 100:5 to 100:25.

In embodiments, the Fischer-Tropsch catalyst further comprises potassium, due to incorporation thereof via double promotion of the precipitate, including chemical promotion with a source of potassium as well as the structural promotion via (a) or (b), and has a weight ratio of Fe:K in the range of from about 100:2 to 100:5. The source of potassium may be selected from the group consisting of KOH, $K_2O$, and combinations thereof.

In embodiment, promoting comprises combining the precipitate with (a) silicic acid and one or more component selected from the group consisting of non-crystalline silicas, crystalline silicas, and sources of kaolin, and the source of silicon comprises up to or equal to about 5 weight percent silicic acid. Promoting may comprise combining the precipitate with silicic acid and at least one non-crystalline silica. In embodiments, the at least one non-crystalline silica is selected from the group consisting of fumed silicas. In embodiments, promoting comprises combining the precipitate with silicic acid, at least one non-crystalline silica, and at least one source of kaolin.

In embodiments, promoting comprises combining the precipitate with silicic acid and at least one crystalline silica. In embodiments, promoting comprises combining the precipitate with silicic acid, at least one crystalline silica, and at least one source of kaolin.

In embodiments, promoting comprises combining the precipitate with silicic acid, at least one crystalline silica, at least one non-crystalline silica, and at least one source of kaolin.

In embodiments, the Fischer-Tropsch catalyst comprises iron and copper, due to preparation of the nitrate solution with one or more one metal slurry comprising iron, copper, or both, and has a weight ratio of Fe:SiO2 in the range of from about 100:5 to 100:25, and a weight ratio of Fe:Cu in the range of from about 100:2 to about 100:5.

In embodiments, promoting comprises combining the precipitate with (b) at least one component selected from the group consisting of non-crystalline silicas and sources of kaolin, in the absence of silicic acid. In embodiments, promoting comprises combining the precipitate with at least one non-crystalline silica, in the absence of silicic acid. The non-crystalline silica may be selected from fumed silicas. In embodiments, promoting comprises combining the precipitate with at least one source of kaolin, in the absence of silicic acid. In embodiments, promoting comprises combining the precipitate with at least one non-crystalline silica and at least one source of kaolin, in the absence of silicic acid.

In embodiments, the basic solution comprises at least one selected from the group consisting of sodium carbonate and ammonium hydroxide. In embodiments, the spray-dried Fischer-Tropsch catalyst is substantially spherical, and the desired particle size is in the range of from about 40 to about 100 micrometers.

In embodiments of the Fischer-Tropsch catalyst, formation thereof further comprises: filtering to remove liquids from the precipitate and form a filter residue, reslurrying the filter residue, and combining the reslurried residue with (a) or (b), wherein the reslurried residue has a pH of greater than or equal to about 10, enabling superior dissolution of the structural promoters of (a) or (b). In embodiments, upon calcination, the calcined catalyst has a surface area of at least 70 $m^2/g$, a pore volume in the range of from about 0.2 and 0.3, an average pore size in the range of from 50 and 78 Å, or a combination thereof. In embodiments, the Fischer-Tropsch catalyst comprises a substantially homogeneous distribution of structural promoter, provided via structural promotion of (a) or (b) at a pH of greater than or equal to about 10.

In embodiments, the Fischer-Tropsch catalyst further comprises platinum, due to incorporation thereof during structural promotion, and the weight ratio of Fe:Pt in the Fischer-Tropsch catalyst is in the range of from about 100:1 to about 100:2.

In embodiments, the Fischer-Tropsch catalyst is characterized by production of less than about 6 weight percent fines after 5 hours ASTM Air Jet Attrition testing.

Also disclosed herein is a structurally promoted, precipitated, Fischer-Tropsch catalyst characterized by production of less than 6 weight percent fines after 5 hours ASTM Air Jet Attrition testing, due to formation via: preparing a nitrate solution, wherein preparing comprises forming at least one metal slurry and combining the at least one metal slurry with a nitric acid solution; combining the nitrate solution with a basic solution to form a precipitate; structurally promoting the precipitate with at least one source of silicon to form a promoted mixture, wherein promoting comprises combining the precipitate with (a) silicic acid and one or more component selected from the group consisting of non-crystalline silicas, crystalline silicas, and sources of kaolin or (b) at least one component selected from the group consisting of non-crystalline silicas and sources of kaolin, in the absence of silicic acid; and spray drying the promoted mixture to produce catalyst having a desired particle size. The Fischer-Tropsch catalyst may be characterized by the production of less than 4, 3.4, 3, 2, or 1.3 weight percent fines after 5 hours ASTM Air Jet Attrition testing. In embodiments, promoting comprises combining the precipitate with (a) silicic acid and one or more component selected from the group consisting of non-crystalline silicas, crystalline silicas, and sources of kaolin, and the source of silicon comprises up to or equal to about 5 weight percent silicic acid. In embodiments, enhanced physical attrition resistance of the Fischer-Tropsch catalyst is provided by a multi-step structural promotion, wherein the silicic acid is added to the precipitate separately from any other source of silicon, relative to a Fischer-Tropsch catalyst in which the silicic acid is added in the same step as any other source of silicon. The Fischer-Tropsch catalyst may have a main reduction peak temperature in the range of from about 204° C. and 259° C.

In embodiments, the Fischer-Tropsch catalyst comprises iron, due to preparation of the nitrate solution with an iron slurry, and has a weight ratio of Fe:SiO2 in the range of from about 100:6 to 100:24. In embodiments, the Fischer-Tropsch catalyst has a BET surface area in the range of from about 144 $m^2/g$ to about 237 $m^2/g$. In embodiments, the Fischer-Tropsch catalyst has a pore volume in the range of from about 0.2 to about 0.3. In embodiments, the Fischer-Tropsch catalyst has an average pore size in the range of from 50 and 78 Å. In embodiments, the Fischer-Tropsch catalyst comprises a substantially homogeneous distribution of structural promoter, provided via structural promotion of (a) or (b) at a pH of greater than or equal to about 10. In embodiments, the Fischer-Tropsch catalyst is formed via precipitation with basic solution comprising sodium carbonate.

Also disclosed herein is a structurally promoted, precipitated Fischer-Tropsch catalyst comprising a weight ratio of Fe:SiO2 in the range of from about 100:5 to about 100:25, a weight ratio of Fe:K in the range of from about 100:2 to about 100:5, and a weight ratio of Fe:Cu in the range of from about 100:2 to about 100:5, wherein silicon is incorporated into the catalyst via structural promotion of an iron-based catalyst precipitate with up to 5 weight percent silicic acid, with any balance of the silicon in the catalyst being incorporated via structural promotion with another silicon source selected from the group consisting of non-crystalline silicas, crystalline silicas, and sources of kaolin. In embodiments, the balance of the silicon in the catalyst is provided by one or more non-crystalline silicon source. In embodiments, the Fischer-Tropsch catalyst comprises a substantially homogeneous distribution of silicon structural promoter, provided via structural promotion at a pH of greater than or equal to about 10.

In embodiments, the Fischer-Tropsch catalyst exhibits enhanced physical attrition resistance which is provided by a multi-step structural promotion, wherein the silicic acid is added to the iron catalyst precipitate separately from any other source of silicon, relative to a Fischer-Tropsch catalyst in which the silicic acid is added in the same step as any other source of silicon. In embodiments, the Fischer-Tropsch catalyst has a main reduction peak temperature in the range of from about 204° C. and 259° C. In embodiments, the Fischer-Tropsch catalyst is characterized by production of less than about 6 weight percent fines after 5 hours ASTM Air Jet Attrition testing.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
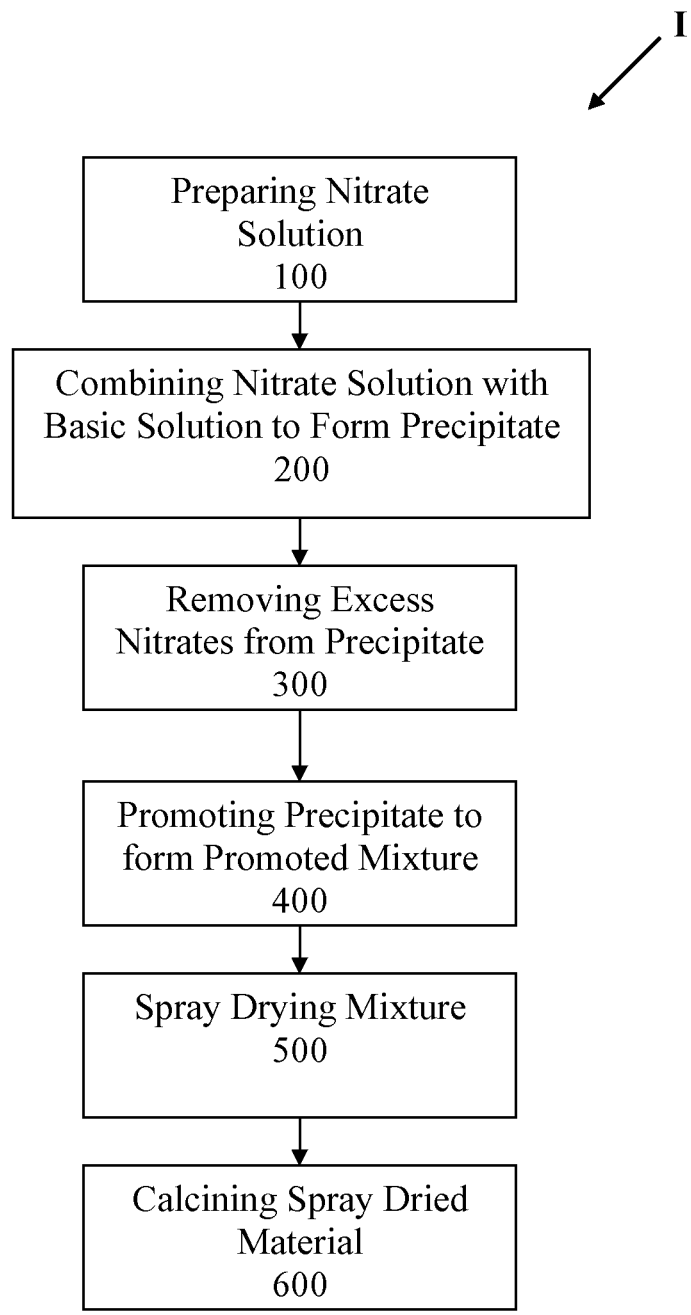
FIG. 1 is a flow diagram of a method of preparing attrition resistant catalyst according to this disclosure.

The Fischer-Tropsch synthesis can be described as a polymerization reaction in which methyl species act as initiators for chain growth. Anderson-Schultz-Flory (ASF) product distribution shows that a polymerization-like process effectively describes the product distribution of the Fischer-Tropsch synthesis. Each carbon number surface species has a probability of continuing the chain growth or terminating the polymerization to produce product. The product spectrum may be characterized by the parameter, alpha, which is the chain growth probability.

DETAILED DESCRIPTION

I. Overview

In an FT process, a hydrogen and carbon monoxide-containing gas stream is introduced into a Fischer-Tropsch reactor which preferably employs a catalyst slurry. The catalyst slurry may comprise an iron-based catalyst. The iron-based catalyst may be a precipitated iron catalyst. The precipitated iron catalyst can be promoted with predetermined amounts of potassium and copper depending on the preselected probability of linear condensation polymerization and the molecular weight distribution sought. Product slurry comprising FT products and FT catalyst is removed from the FT reactor. Catalyst is separated from the product and may be recycled to the FT reactor. In order to enhance separation of catalyst from the product slurry, the FT catalyst should be attrition resistant, so that the catalyst does not break into small particles (or fines) which are difficult to separate from the product in a catalyst/wax separator. The method described herein allows formation of attrition resistant catalyst which maintains selectivity and activity. In embodiments, the method utilizes at least one non-crystalline source of silica as structural promoter. In embodiments, at least two sources of silica are utilized to provide structural support to the attrition resistant precipitated catalyst.

Utilization of higher pH during promotion has been found to provide better promoter distribution. The use of fumed silica results in a better spray dried product, in embodiments, providing better promoter distribution and allowing production of smoother catalyst particles. A higher solids content prior to spray drying allows production of more dense/solid catalyst particles, with fewer cracks. Addition of silicic acid significantly improves catalyst strength and allows more smooth surface morphology. Dual step addition for fumed silica and silicic acid may enhance the attrition resistance of resulting catalyst particles versus single step addition of a mixture of fumed silica and silicic acid.

II. Method

Herein disclosed is a method of producing an attrition-resistant iron-based catalyst. The attrition-resistant iron-based catalyst is structurally-supported with silica. In embodiments, at least two sources of silica are utilized to provide silica structural support to the catalyst. In applications, the sources of silica are selected from non-crystalline sources of silica, crystalline sources of silica, and combinations thereof. In applications, the catalyst is formed utilizing at least one source of crystalline silica and at least one source of non-crystalline silica. In applications, the catalyst is formed using at least two sources of non-crystalline silica. Such non-crystalline sources of silica include fumed colloidal silicas. In embodiments, the silica sources are selected from crystalline silica, silicic acid and crystalline-free silicas (for example CAB-O-SIL® available from Cabot), METAMAX®, Kaolin, and combinations thereof. The attrition-resistant iron-based catalyst can be promoted with copper and potassium.

FIG. 1 is a flow diagram of a method of preparing attrition resistant catalyst according to this disclosure. The method comprises: preparing nitrate solution at 100; combining the nitrate solution with basic solution to form precipitate at 200; removing excess nitrates from the precipitate at 300; promoting the precipitate to form a promoted mixture at 400; and spray drying the mixture at 500. The method may further comprise calcining the spray dried material at 600.

Figure 2:
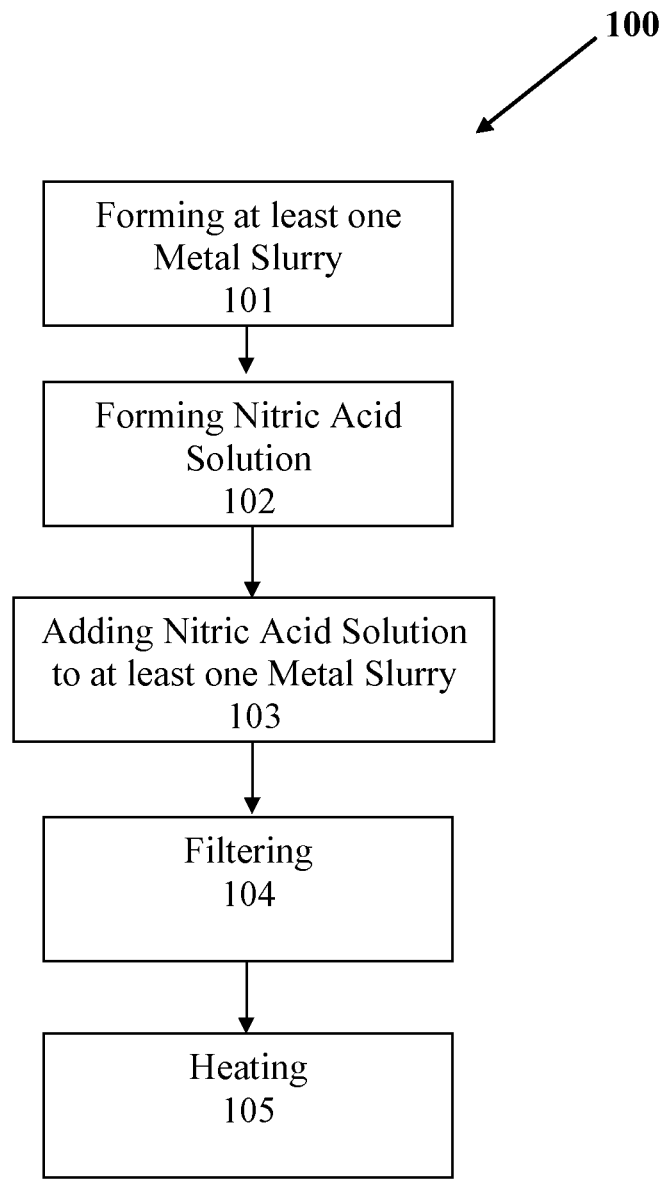
FIG. 2 is a flow diagram of steps for preparing a nitrate solution according to an embodiment of this disclosure.

The method comprises preparing a nitrate solution 100. FIG. 2 is a flow diagram of steps for preparing a nitrate solution 100, according to an embodiment of this disclosure. Preparing a nitrate solution 100 comprises forming at least one metal slurry at step 101. At least one metal slurry comprises iron powder. The at least one slurry may comprise water, iron powder, and at least one other metal powder. The at least one other metal powder may comprise copper powder. In embodiments, forming at least one metal slurry comprises forming at least two metal slurries. In such embodiments, one slurry comprises iron powder and another slurry comprises another metal powder. The other metal powder may comprise, for example, copper powder. In embodiments, copper is combined with water to form a first metal slurry, iron powder is combined with water to form a second metal slurry, and the first and second metal slurries are combined to form an iron/copper slurry. Without wishing to be limited by theory, the use of a slurry (or slurries) may help prevent hot spots due to exothermic reaction during the dissolution process.

Preparing nitrate solution 100 further comprises forming nitric acid solution at 102. Preparing nitric acid solution may comprise combining nitric acid, e.g. 70% $HNO_3$, with water. The nitric acid solution may comprise from 15% to about 20% nitric acid, alternatively, from about 18% to about 19% nitric acid, alternatively, from about 18.7 to 18.9% nitric acid.

Preparing nitrate solution 100 may further comprise adding nitric acid solution to the at least one metal slurry 103. In applications, the nitric acid solution is added, with mechanical stirring, to the metal slurry or slurries drop wise. In embodiments, a portion of nitric acid solution is first combined with copper powder to dissolve the copper and form copper nitrate solution, the resultant copper nitrate solution is added dropwise to the iron powder/water slurry, and a second portion of nitric acid solution is added. The addition of nitric acid to metal slurry(ies) is slow. In applications, the nitric acid solution is added to the metal slurry(ies) at a rate of less than or in the range of from about 15 mL/min to about 20 mL/min. In this manner, the reaction temperature may be controlled to a temperature in the range of from about 30° C. to about 32° C. Desirably, the temperature does not fall below 30° C. and does not exceed 32° C. The dissolution reaction is exothermic and the nitric acid addition can be controlled based on reaction temperature. With intermittent cooling, when ~80% of the nitric acid is added a dark green solution is formed. The combined nitric acid/metal slurry may be allowed to stir for a time. The combined nitric acid/metal slurry may be subjected to stirring (e.g. high speed stirring) for about 15 minutes with no heating.

Preparing nitrate solution 100 may further comprise filtering at step 104. The metal nitrate (e.g., iron nitrate or iron nitrate/copper nitrate) solution may be filtered to remove any undissolved material. In embodiments, excess metal nitrate solution is formed to ensure that there is enough for complete precipitation at step 200, further described hereinbelow. Preparing nitrate solution may further comprise heating at step 105. Heating may comprise heating the filtered metal nitrate solution to a temperature and maintaining the solution at this temperature for a period of time. For example, heating may comprise heating the metal nitrate solution to 70° C. at a rate of about 3° C./minute and maintaining a temperature of 70° C. for 30 minutes. In applications, heating comprises heating the solution to 75° C. at a rate of about 3° C./minute, and maintaining a temperature of 75° C. for about 25 minutes. Above a certain temperature, e.g. a temperature of 60° C. or 65° C., NOx gases with reddish-brown color are produced for several minutes. During this heating period the mixture will change color from a dark green to a red/brown color, allowing visible process monitoring.

Figure 3:
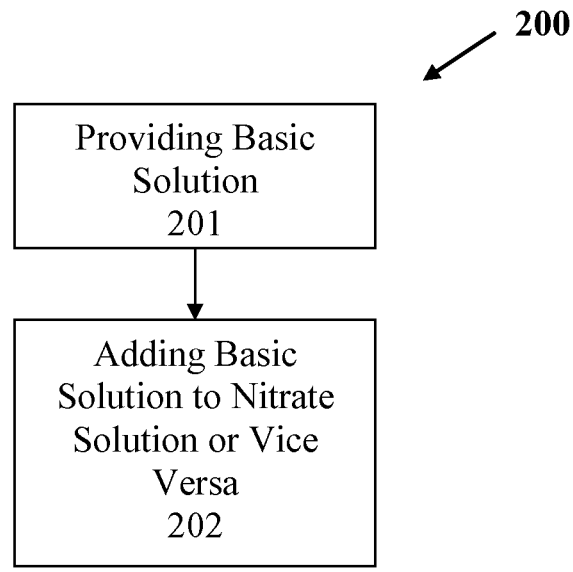
FIG. 3 is a flow diagram of steps in combining nitrate solution with basic solution to form precipitate according to an embodiment of this disclosure.

The method further comprises combining nitrate solution from 100 with basic solution to form precipitate at step 200. FIG. 3 is a flow diagram of steps in combining nitrate solution with basic solution to form precipitate according to an embodiment of this disclosure. Combining nitrate solution with basic solution to form precipitate may comprise providing a basic solution 201 and adding basic solution to nitrate solution or vice versa (i.e., adding nitrate solution to basic solution) 202.

Providing basic solution may comprise providing an ammonium hydroxide solution, a sodium carbonate solution, or both. In embodiments, providing a sodium carbonate solution comprises adding sodium carbonate to water. The sodium carbonate solution may comprise, for example, an 80 g/L sodium carbonate solution. Providing basic solution may comprise providing an ammonium hydroxide solution. In embodiments, providing an ammonium hydroxide solution comprises providing a 14.5% ammonium hydroxide solution. Ammonium hydroxide solution may be prepared by combining equal volume portions of 28-30% ammonium hydroxide and DI water. An excess of ammonium hydroxide solution may be provided, such that some of the excess may be used during a precipitate slurry pH adjustment step below (may be part of step 202 or 401, for example). Providing basic solution may further comprise heating the basic solution to a heated basic solution temperature. The heated basic solution temperature may be, for example, 70° C.

Combining nitrate solution with basic solution to form precipitate 200 further comprises adding basic solution to nitrate solution or vice versa 202. In embodiments, the basic solution is combined with the heated nitrate solution from step 105. In embodiments, the basic solution is at room temperature when combined with the heated nitrate solution. In embodiments, the basic solution is at a heated basic solution temperature when combined with the heated nitrate solution. For example, a room temperature basic solution (e.g., ammonium hydroxide solution) may be added quickly to a hot iron nitrate solution (e.g., 68° C.±2° C.) over a time period (e.g., 11±2 min.). The pH of the solution may be monitored during step 202. In embodiments, neither solution is heated further during step 202. Basic solution is added until a precipitate forms. Precipitate may form at a pH in the range of from 2.5 to 4. Further base may be added with mixing until a desired pH is attained. The desirable pH at the end of step 202 may be about 7.20±0.1. The mixture may subsequently be stirred at elevated temperature (e.g., 70° C.) for a time (e.g., 5 min.) while a desirable pH (e.g., a pH of 7.15±0.1) is maintained. Ammonium hydroxide may be added to keep the desired pH. After stirring for a time (e.g., 5 min) the slurry may be immediately pumped to a filtering unit of step 301.

In other embodiments, a heated (e.g., 70° C.) nitrate solution is added quickly to a heated (e.g., 70° C.) basic solution (e.g., sodium carbonate solution). Addition may be over a period of about 10 min. At pH 7.7 to 7.0, a foam head may form on top of a precipitate. Base addition may be continued until a desired pH is attained. The desired pH may be about 6.9±0.1.

Figure 4:
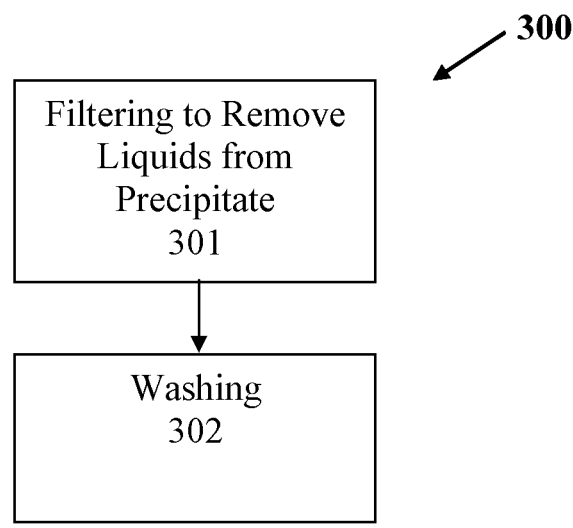
FIG. 4 is a flow diagram of possible steps included in removing excess nitrates from the precipitate according to an embodiment of this disclosure.

Method I further comprises, at step 300, removing excess nitrates from the precipitate formed in step 200. FIG. 4 is a flow diagram of an embodiment of possible steps included in removing excess nitrates from the precipitate 300. Removing excess nitrates may comprise filtering to remove liquids from the precipitate 301 and washing 302 until nitrates are substantially removed. Once the desired pH is attained in step 202, the slurry is introduced into a filter unit and filtered 301. The filtered residue is thereafter washed by introducing wash solution to the filter. Wash solution may comprise water or hot condensate. Washing may comprise washing with up to 6 L of water. Washing/filtering may proceed until the filtrate is substantially free of nitrates. Washing/filtering may proceed until the filtrate has a pH of about 7, alternatively a pH of about 6. Washing/filtering may proceed until the filtrate has a conductivity of about 19 μs/cm. In embodiments, following washing, the filter residue is dried sufficiently (e.g., vacuum dried for 10 minutes) so that it is easily removed from the filter paper, but not so that it is totally dry.

Figure 5:
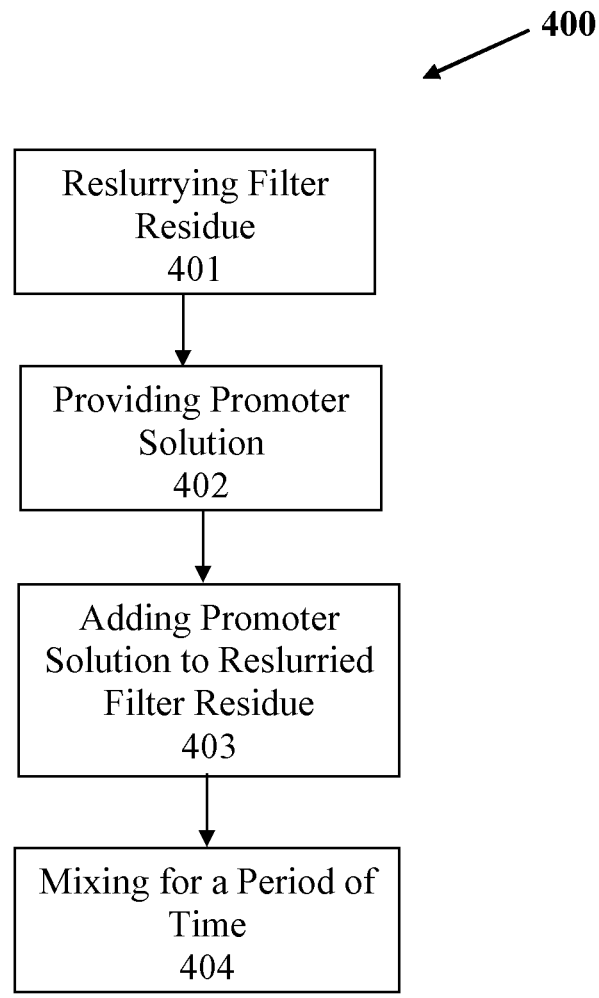
FIG. 5 is a flow diagram of steps in promoting the precipitate to form a promoted mixture 400 according to an embodiment of this disclosure.

Method I further comprises promoting the precipitate to form a promoted mixture at step 400. FIG. 5 is a flow diagram of steps in promoting the precipitate to form a promoted mixture 400 according to an embodiment of this disclosure. The filtered residue from step 300 should be slurried and spray dried as soon as possible, preferably in less than 24 hours. Promoting the precipitate comprises reslurrying the filter residue at 401, providing a promoter solution at 402, adding promoter solution to reslurried filter residue at 403. Promoting may further comprise mixing for a period of time at step 404. Reslurrying the filter residue 401 may comprise combining the filtered residue with water, nitric acid, or a combination thereof to a desired solids content. The desired solids content may be from about 15 weight percent to about 20 weight percent. In embodiments, the reslurry has a weight percent solids of about 17%.

Conventionally, precipitated iron catalysts are precipitated to neutral or close thereto. Silica and potassium promotion typically takes place in a one or two-step procedure after the washing and reslurrying steps, with a pH below 9. However, according to this disclosure, utilizing a pH closer to 10 or 10.5, allows silica to be dissolved and particle growth to be inhibited. Thus, the pH of the 'reslurry' (i.e., the reslurried filtered residue) may be adjusted following reslurrying. The pH adjustment may be performed using ammonium hydroxide solution from step 201. The reslurry may be stirred for a time, e.g., 15 minutes, to ensure distribution. In embodiments, the pH of the reslurry is brought to a pH of about 10, a pH of greater than or about 10, or a pH above 10 prior to step 403. Without wishing to be limited by theory, it is believed that co-addition of silicic acid decreases surface tension of the promoter solution, enhancing distribution of silica and potassium throughout the iron slurry and allowing homogeneous distribution of promoter. It is also postulated that the presence of silicic acid may improve the spherical nature of the resulting spray-dried catalyst particles, providing larger, smoother, and/or more spherical spray dried catalyst particles and enhancing the attrition resistance of the catalyst. Silicic acid also has a polymeric silica structure that may increase the structural stability of the resulting catalyst.

In embodiments, providing a promoter solution 402 comprises combining at least one promoter with water. The promoter solution may be stirred for a time period to ensure complete mixing. The time period may be, for example, 24 hours.

The promoter may be selected from potassium hydroxide, and at least one source of silicon. In embodiments, at least one source of silicon comprises crystalline silica. Promotional species may be formed from dissolved silica. In embodiments, double promotion is utilized, wherein structural promoter (e.g., $SiO_2$, $Al_2O_3$, or combination thereof) and chemical promoter (e.g., potassium as, for example, KOH) are added concurrently to the precipitated iron slurry. In applications, a mixture of chemical promoter (e.g., potassium) and physical/structural promoter (e.g., silica) is created by co-mixing potassium hydroxide and crystalline silica, hence dissolving $SiO_2$. The silicon-containing structural promoter and the potassium chemical promoter should be evenly distributed throughout the catalyst matrix via the disclosed methods.

In embodiments, the promoter comprises at least two sources of silicon, and at least one source of silicon comprises crystalline silica. In embodiments, at least one source of silicon comprises non-crystalline silica. In embodiments, at least one source of silicon comprises silicic acid. In embodiments, the promoter comprises at least two sources of silicon, and at least one source of silicon comprises crystalline silica. In embodiments, the promoter comprises silicic acid and at least one crystalline silica. Silicic acid may be co-added with crystalline silica at an amount of 0.5%, 1%, or 5%). In embodiments, one-step addition of silicon-containing species is followed, alternatively two step addition. For example, silicic acid may be co-mixed with crystalline and/or fumed silica or silicic acid may be added before or after addition of crystalline or fumed silica. In embodiments, the promoter comprises silicic acid and at least one non-crystalline silica. The promoter may be selected from silicic acid, amorphous silicas, crystalline silicas, and combinations thereof. In embodiments, the promoter is selected from potassium hydroxide, silicic acid, fumed silicas, colloidal silicas, and combinations thereof. In embodiments, the promoter comprises potassium hydroxide and at least one silicon source selected from non-crystalline silicas. The source of silicon may be selected from silicic acid, natural pozzolan (e.g., metakaolin such as METAMAX® available from BASF), kaolinite, kaolin, and non-crystalline silicon dioxide. Metakaolin is kaolinite calcined at, for example, 700° C.

In specific embodiments, the promoter comprises silicic acid, potassium hydroxide, and at least one crystalline silica (see Examples 2 and 4 hereinbelow). In embodiments, the promoter comprises potassium hydroxide, silicic acid, and at least one non-crystalline silica (see Examples 3, 6-8, 14-15, 22, 24, 32-33, and 36 hereinbelow). In embodiments, the promoter comprises potassium hydroxide, silicic acid, at least one crystalline silica, and at least one non-crystalline silica. In embodiments, the catalyst is promoted, in the absence of silicic acid, with potassium hydroxide and at least one non-crystalline silica (see Examples 1, 5, 13, 19-21, 23, 25-28, 34, and 37-45 hereinbelow). In embodiments, the catalyst is promoted, in the absence of silicic acid, with $K_2O$ and at least one non-crystalline silica (see Example 10 hereinbelow). In embodiments, the catalyst is promoted, in the absence of silicic acid, with at least two non-crystalline silicas (see Examples 12, and 16-18 hereinbelow). In embodiments, the promoter comprises at least one non-crystalline silica and at least one source of kaolin (see Example 9 hereinbelow). In embodiments, the promoter comprises at least two non-crystalline silicas and at least one source of kaolin (see Examples 16-18 hereinbelow). In embodiments, the promoter comprises potassium hydroxide and at least one crystalline silica. In embodiments, the promoter comprises potassium hydroxide and at least one non-crystalline silica. In embodiments, the promoter comprises potassium hydroxide, at least one crystalline silica, and at least one non-crystalline silica. In embodiments, the promoter comprises potassium hydroxide and natural pozzolan. In embodiments, the promoter comprises potassium hydroxide, natural pozzolan, and crystalline silica.

In embodiments, providing promoter solution 402 comprises combining non-crystalline silica source (e.g., CAB-O-SIL®), KOH, and DI water. Water and non-crystalline silica (e.g., CAB-O-SIL®) may be combined and mixed to remove lumps and form a silica gel solution. Then potassium hydroxide may be added to the silica gel solution and mixed well until no particles are visible. The promoter solution may be stirred for a time, e.g. up to about 24 hrs.

In embodiments, providing promoter solution 402 comprises combining fumed silica (e.g., CAB-O-SIL®) slowly, in portions, and potassium hydroxide dissolved in DI water, while ensuring the combination is well dispersed and no lumps are formed. The promoter solution is well mixed for a time, e.g., up to about 24 hours.

Promoting precipitate 400 may further comprise adding the promoter solution to reslurry at step 403. Following combining of promoter solution with reslurry 403, the combination may be mixed (e.g., high speed stirring) for a promotion time 404. The promotion time may be, for example, about 15 minutes. During the promotion time, the promoted slurry may be stirred at high speed (e.g., 700-900 rpm).

The promoted catalyst may comprise a weight ratio of Fe/Cu in the range of from about 100:2 to about 100/26; alternatively from about 100:2 to about 100:5. The promoted catalyst may comprise a ratio of Fe/K in the range of from about 100:2 to about 100:5. The promoted catalyst may comprise a ratio of Fe/K$_2$O in the range of from about 100:2.5 to about 100:5; alternatively about 100:5, 100:4, or 100:2.5. The promoted catalyst may comprise a ratio of Fe/Si in the range of from about 100:5 to 100:11, alternatively, about 100:7 or 100:11. The promoted catalyst may comprise a ratio of Fe/SiO$_2$ in the range of from about 100:5 to 100:25, alternatively, from about 100:6 to about 100:22, alternatively, about 100:6, 100:12, 100:15, 100:18, or 100:22. The promoted catalyst may comprise a ratio of Fe/Al$_2$O$_3$ in the range of from about 100:5 to about 100:8, alternatively, about 100:5 or 100:8. The promoted catalyst may further comprise platinum at a ratio of Fe/Pt in the range of from about 100:1 to about 100:2, alternatively, about 100:1. The promoted catalyst may comprise a ratio of Fe:pozzolon (e.g., METAMAX®) in the range of from about 100:10 to about 100:20; alternatively, from about 100:12 to about 100:18; alternatively 100:18, or 100:12.

Method I further comprises spray drying the promoted mixture at step 500. Spray drying may be performed via any method known in the art. In embodiments, the promoted mixture is spray dried to substantially spherical particles with a normal size distribution between 40-100 microns. In embodiments, spray drying comprises spray drying such that the mean particle size is approximately 80 microns. The addition of poly-vinyl alcohol (PVA), ZrO$_2$, or a combination thereof to the reslurry prior to spray drying may assist with spray drying catalyst, producing increased strength (i.e., attrition resistant) catalyst. A Type H, Mobile Niro Spray Dryer, available from Niro, may be used to spray dry the promoted mixture. The Niro Spray Dryer consists of a two-fluid nozzle atomizer, drying chamber, air disperser, chamber, product collection section, air ducts, cyclone, exhaust fan, air heater, and instrument panel. The "feed" (promoted mixture) is introduced through a nozzle from the bottom with the drying air cross flowing from the top. In applications, the following conditions are utilized for spray drying the promoted mixture: inlet temperature of 370° C. (±2° C.); outlet temperature of 79° C. (±3.0° C.); slurry solids content in the range of from about 10 to about 20%, from about 15 to about 20%, or from about 10.5 and 16.5%; water setup flow of 4.0 to 4.5 kg/hr (feed flow is set with water, and then switched to actual feed slurry); and atomizer air flow of 1 bar with a 30% setting on a variable area flow meter. In embodiments, the spray dried catalyst particles have a Gaussian particle size distribution with a mean particle size in the range of from about 30 and about 80 microns, or from about 38 to 80 microns.

Figure 6:
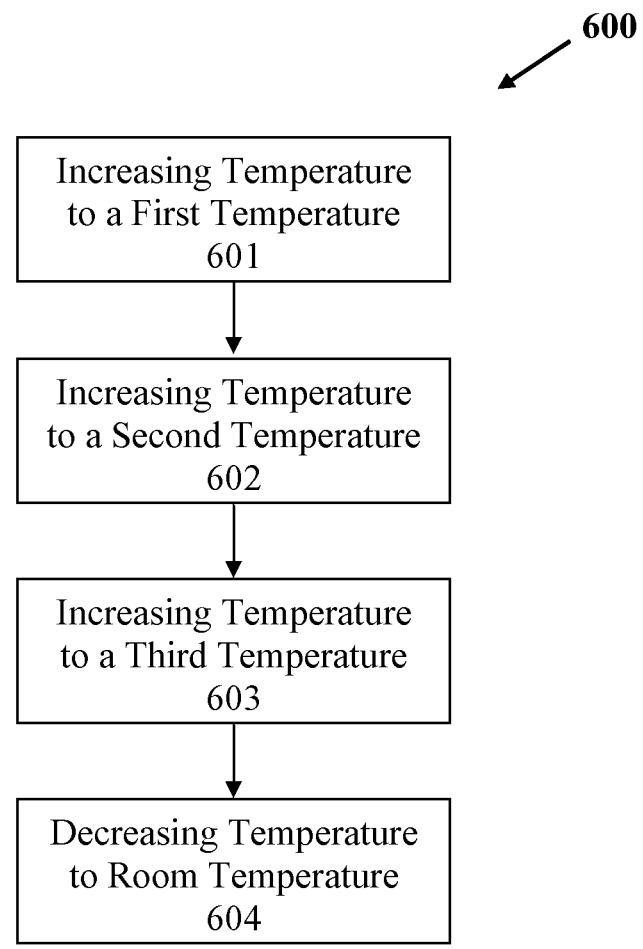
FIG. 6 is a flow diagram of steps utilized in calcining spray dried material according to an embodiment of this disclosure.

Method I may further comprise calcining the spray dried particles 600. The spray dried particles may be calcined as soon as possible to minimize aging. FIG. 6 is a flow diagram of steps utilized in calcining spray dried material 600 according to an embodiment of this disclosure. Calcining 600 may comprise increasing the temperature to a first temperature at 601; increasing the temperature to a second temperature at 602; increasing the temperature to a third temperature at 603; and decreasing the temperature to room temperature at 604.

Increasing the temperature to a first temperature at 601 may comprise increasing the temperature of the spray dried particles from room temperature to a first temperature. The first temperature may be a temperature in the range of from about 120° C. to about 160° C. The first temperature may be about 140° C. The temperature may be increased at a rate in the range of from about 0.2° C./min to about 1° C./min, for example about 0.5° C./min. The spray dried particles may be held at the first temperature for a first dwell time. The first dwell time may be, for example, about 4 hours.

Increasing the temperature to a second temperature at 602 may comprise increasing the temperature from room temperature or from the first temperature to a second temperature. The second temperature may be a temperature in the range of from about 180° C. to about 220° C. The second temperature may be about 200° C. The temperature may be increased at a rate in the range of from about 0.2° C./min to about 1° C./min, for example about 0.5° C./min. The spray dried particles may be held at the second temperature for a second dwell time. The second dwell time may be, for example, about 4 hours.

Increasing the temperature to a third temperature at 603 may comprise increasing the temperature of the spray dried particles to a temperature in the range of from about 280° C. to about 320° C. The third temperature may be about 300° C. The temperature may be increased at a rate in the range of from about 0.2° C./min to about 1° C./min, for example about 0.5° C./min. The spray dried particles may be held at the third temperature for a third dwell time. The third dwell time may be, for example, about 4 hours.

Calcining may further comprise allowing the temperature to decrease to room temperature at step 604.

In embodiments, calcining further comprises increasing from room temperature to 140° C. at 0.5° C./min, and dwelling at this temperature for four hours; and/or decreasing to room temperature at 5.0° C./min.

Activation of the catalyst may comprise a two step procedure comprising exposure of the catalyst to hydrogen, followed by exposure to synthesis gas.

III. Properties of Improved Catalyst

Activity, Selectivity, CO Conversion, Yield and Alpha.

In embodiments, the methods of producing iron-based catalysts yield catalysts for which the structural integrity of the catalyst is enhanced while maintaining substantial catalytic activity.

As shown in the examples hereinbelow, the addition of small quantities of silicic acid (i.e., less than or about 5 percent by weight) has been found to inhibit physical attrition of a catalyst structurally supported with fumed silica. In embodiments, less than 5.5 weight percent, less than 5 weight percent fines, less than 4 weight percent fines, less than 3.4 weight percent fines, less than 3 weight percent fines or less than 2 weight percent fines is produced after 5 hours ASTM Air Jet Attrition testing. Such attrition testing is believed to be more severe relative to actual flow dynamics in a slurry bed reactor. In embodiments, the catalyst produced via the disclosed method produces fines in the range of from about 1.3% to about 6.3% after 5 hours ASTM Air Jet Attrition testing.

A first catalyst attrition index, RCAI-10, is defined herein as (the percentage of particles having particle size less than 10 microns after activation minus the percentage of particles having a particle size less than 10 microns before activation)/(100 minus percentage of particles having a particle size less than <10 microns before activation)*100; RCAI-10 thus indicates the percentage of particles having a particle size less than 10 microns. A second catalyst attrition index, RCAI-20, is defined herein as (the percentage of particles having a particle size less than 20 microns after activation minus the percentage of particles having a particle size less than 20 microns before activation)/(100 minus the percentage of particles having a particle size less than 20 microns before activation)*100; RCAI-20 thus indicates the percentage of particles having a particle size less than 20 microns. In embodiments, the catalysts of this disclosure exhibit RCAI-10 values in the range of from about 0 to about 2.8. In embodiments, the catalysts of this disclosure exhibit RCAI-20 values in the range of from about 0 to about 4.3. In embodiments, the catalysts exhibit sufficient chemical attrition behavior with RCAI-10 in the range of from about 0 to about 2.8 and RCAI 20 in the range of from about 0 to about 4.3. For example, in embodiments, the catalyst exhibits RCAI-20 and RCAI-10 indices of about 0.64 and 0.10 respectively.

The presence of silica is believed to increase the density of the catalyst and promote the spray drying to produce smooth substantially spherical catalyst particles that are more attrition resistant than less smooth, and less round or non-spherical particles.

Literature on silica promotion of catalysts indicate an increase in surface area for silica addition up to approximately 20-25% silica. Surprisingly, catalysts produced according to the disclosed method exhibited an opposite trend. Two 24SiO$_2$/100Fe catalysts indicated BET surface areas of 144 and 150 m$^2$/g, while a 12SiO$_2$/100Fe catalyst indicated a 234 m$^2$/g surface area. Similarly, a 12SiO$_2$/100Fe catalyst indicated a 226 m$^2$/g surface area, while a 6SiO$_2$/100Fe exhibited 237 m$^2$/g. In embodiments, the calcined catalyst has a surface area of at least 70 m$^2$/g. In embodiments, the pore volume of the catalyst is in the range of from about 0.2 and 0.3. In embodiments, the pore size of the supported catalyst is in the range of from 50 and 78 Å.

Catalyst formed using fumed silica may provide increased BET surface area when compared with catalyst formed with crystalline silica. The addition of small amounts (e.g., less than or about 5 weight % silicic acid) may not significantly alter the BET surface area of fumed silica promoted catalysts, but may significantly enhance the BET surface area and/or pore volume of crystalline silica-promoted catalysts. The addition of silicic acid to crystalline-silica promoted catalysts may decrease the TPR peak temperature, while the addition of silicic acid to fumed-silica promoted catalysts may have less significant effect on TPR peak temperature.

In embodiments, use of sodium carbonate provides catalyst with increased BET surface areas relative to catalysts formed with ammonium hydroxide. In embodiments, the main reduction peak temperature of the catalysts produced according to this disclosure are in the range of from about 204° C. and 232° C.

Utilization of fumed silica may provide more smooth distribution of promoters throughout the resulting catalyst as compared with crystalline silica.

Separation Efficiency and Fines Production

One of the characteristics of a slurry Fischer-Tropsch reactor designed to produce heavier hydrocarbon products is the continuous increase in slurry height due to the low volatility of the heavier waxes. In embodiments, during FT operation, catalyst is separated from reaction product via a separation unit from which a wax filtrate is obtained. One method to maintain the slurry level to a constant value is to use a cross-flow filter to remove filtered wax while returning the catalyst to the reactor.

EXAMPLES

Overview

Catalysts were formed using the disclosed method. Example 1 catalysts (catalyst numbers 1-34) were created utilizing basic solution comprising ammonium hydroxide and the ingredients presented in Table 1 hereinbelow. Example 2 catalysts (catalyst numbers 35-45) were created utilizing basic solution comprising sodium carbonate and the ingredients presented in Table 2 hereinbelow. Table 3 presents the compositions of all catalysts 1-45.

Example 1

Catalysts Formed Using Iron-Copper Nitrate, Ammonium Hydroxide, and Various Sources of Silica Supported attrition resistant iron-based Fischer-Tropsch catalysts promoted with copper and potassium were formed using elemental iron as starting material. The experimental steps used in manufacturing the catalyst are listed hereafter and further described hereinbelow. The basic steps comprised: (1) preparation of iron and copper nitrate solution; (2) preparation of ammonium hydroxide solution; (3) preparation of promoter gel, (4) precipitation, (5) washing, (6) addition of promoter gel, (7) drying and sizing, and (8) calcining. A list of the catalysts produced is provided in Table 1.

Reagents

The basic components or reagents used in the manufacturing process include: (1) Iron Powder, Fe (Hoganas, 98.61% Fe, −325 mesh), 80.744 g, (2) Copper Metal, Cu (Alfa Aesar, 99.5% Cu, −40+100 mesh), 1.600 g, (3) Potassium Hydroxide, KOH (Sigma Aldrich) 9.900 g, 45 wt. % in water, (4) Nitric Acid, 70% (Fisher), 403.2 g (288 mL), Certified ACS PLUS grade, (5) Ammonium Hydroxide, NH$_4$OH (EMO, 28-30%) 290 mL, ACS reagent grade, (6) CAB-O-SIL® Untreated Fumed Silica (Monson), 17.65 g, Silicon Dioxide, Synthetic, Crystalline-Free, and (7) DI Water.

Manufacturing Procedure

In the procedure below items in normal text should be considered specifications and items in italics should be considered as guidelines.

(1.) Iron powder, 80.744 g, and copper powder, 1.600 g, are slurried with 400 mL of DI water. The slurry helps to prevent hot spots due to exothermic reaction during the dissolution process.

(2.) Nitric Acid, 403.2 g (288 mL) of 70% $HNO_3$, is dissolved in 1208 mL DI water.

(3.) With mechanical stirring, the nitric acid solution is added to the iron slurry dropwise. The addition rate is slow, max. 15-20 mL/min, such that the reaction temperature between 30° C.-32° C. (the temperature should not fall below 30° C., and not exceed 32° C.). This dissolution reaction is exothermic and the addition can be controlled based on reaction temperature. With intermittent cooling, when ~80% of the nitric acid is added a dark green solution is formed.

(4.) The mixture is allowed to stir for approximately 15 minutes without heating.

(5.) The iron nitrate—copper nitrate solution is then filtered to remove any undissolved material.

(6.) The solution is then heated to 75° C. at ~3° C./minutes and maintained at 75° C. for 25 minutes. Just above 60° C., $NO_x$ gases with reddish-brown color are produced for several minutes. During this heating period the mixture will change color from a dark green to a red/brown color.

(7.) A 14.5% ammonium hydroxide solution, 580 ml, is prepared by combining equal volume portions of 28-30% ammonium hydroxide and DI water. The 600 ml will constitute an excess, which can be used during the precipitate slurry pH adjustment step below.

(8.) The room temperature base solution is added quickly to the hot iron nitrate solution (68° C.±2) over 11 (±2) minutes while monitoring the pH of the solution. Neither solution is heated. At pH 2.5 to 4, a voluminous precipitate forms and the stirring becomes inefficient. The addition of the base is continued and enough mixing induced to regain stirring efficiency. Base addition is then continued until a pH of 7.20±0.1 is achieved.

(9.) The mixture is then stirred at 70° C. for 5 minutes while a pH of 7.15±0.1 is maintained. The pH will slowly drop from 7.20 after precipitation to 7.15 over the 5 minute mixing period at 70° C. Small additions of ammonium hydroxide are made to keep the required pH. After 5 minutes the slurry is immediately pumped to the filtering unit.

(10.) The mixture is filtered and washed with 6 liters of water till free of nitrates (filtrate pH was 7).

(11.) The filter residue is dried sufficiently so that it is easily removed from the filter paper, but not so that it is totally dry. The filtered residue is then slurried again using 56.7 g DI water and 64.0 g $HNO_3$ solution. The slurry is stirred for 15 minutes (pH=10.01) followed by the addition of 89.9 g promoter (17.65 g CAB-O-SIL®+9.9 g KOH+80.0 g DI water-mix Cab-o-Sil® into DI water, make sure no lumps, add KOH to the silica gel solution, mix well so no particle visible, stir it for 24 hrs) which is then stirred for another 15 minutes (pH=11.61). High speed stirring (700-900 rpm) for another 15 minutes.

(12.) The mixture is spray dried to spherical particles with a normal size distribution between 40-100 microns (mean at approximately 80 microns). The Type H, Mobile Niro Spray Dryer consists of a two-fluid nozzle atomizer, drying chamber, air disperser, chamber, product collection section, air ducts, cyclone, exhaust fan, air heater, and instrument panel. The "feed" is introduced through a nozzle from the bottom with the drying air cross flowing from the top. The Inlet Temperature was about 370° C. (±2); the Outlet Temperature was about 75° C. (±2.0); the slurry Solids Content was in the range of from about 15 to about 20%; the Water Setup Flow was 4.0 to 4.5 kg/hr (feed flow is set with water, and then switched to actual feed slurry); and the Atomizer Air Flow was 1 bar with a 30% setting on a variable area flow meter.

(13.) The spray dried samples are then calcined in a porcelain crucible as soon as possible to minimize aging. The material is calcined as follows: (1) increase from room temperature to 140° C. at 0.5° C./min., dwell for 4 hours at this temperature; (2) increase from room temperature to 200° C. at 0.5° C./min., dwell for 4 hours at this temperature; (3) increase from room temperature to 300° C. at 0.5° C./min., dwell for 4 hours at this temperature; and (4) decrease to room temperature.

As shown in Table 1, catalysts produced according to this recipe included: (1) RI-DD-19 (100Fe/5Cu/7K/11Si); (2) RI-DD-20 (100Fe/5Cu/7K/11Si); (3) RI-DD-21 (100Fe/5Cu/7K/11Si); (4) RI-DD-22 (100Fe/5Cu/7K/6Si); (5) RI-DD-23 (100Fe/5Cu/7K/6Si); (6) RI-DD-24 (100Fe/2Cu/5K2O/12SiO2); (7) RI-DD-25 (100Fe/2Cu/5K2O/22SiO2); (8) RI-DD-26 (100Fe/2Cu/5K$_2$O/22SiO$_2$); (9) RI-DD-27 (100Fe/2Cu/5K2O/5K$_2$O$_3$/18SiO$_2$) [12METAMAX/100Fe]; (10) RI-DD-28 (100Fe/2Cu/5K$_2$O/22SiO$_2$); (11) RI-DD-29 (100Fe/2Cu/5K$_2$O/22SiO$_2$); (12) RI-DD-30 (100Fe/2Cu/5K$_2$O/22SiO$_2$); (13) RI-DD-31 (100Fe/5Cu/5K$_2$O/22SiO$_2$); (14) RI-DD-32 (100Fe/5Cu/5K$_2$O/22SiO$_2$); (15) RI-DD-33 (100Fe/5Cu/5K$_2$O/22SiO$_2$); (16) RI-DD-34 (100Fe/5Cu/5K$_2$O/8Al$_2$O$_3$/15SiO$_2$) [100Fe/22]; (17) RI-DD-35 (100Fe/5Cu/5K$_2$O/22SiO$_2$); (18) RI-DD-36 (100Fe/5Cu/5K$_2$O/22SiO$_2$) Same as RI-DD-35, sample not homogenized before spray drying; (19) RI-DD-37 (100Fe/2Cu/5K$_2$O/12SiO$_2$) sample not homogenized before spray drying (20) RI-DD-38 (100Fe/2Cu/5K$_2$O/12SiO$_2$); (21) RI-DD-39 (100Fe/2Cu/5K$_2$O/12SiO$_2$); (22) RI-DD-40 (100Fe/5Cu/5K$_2$O/22SiO$_2$); (23) RI-DD-41 (100Fe/2Cu/5K$_2$O/22SiO$_2$); (24) RI-DD-42 (100Fe/2Cu/5K$_2$O/22SiO$_2$); (25) RI-DD-43 (100Fe/26Cu/5K$_2$O/12SiO$_2$); (26) RI-DD-44 (100Fe/2FCu/5K$_2$O/12SiO$_2$); (27) RI-DD-45 (100Fe/2Cu/5K$_2$O/12SiO$_2$); (28) RI-DD-46 (100Fe/2Cu/5K$_2$O/6SiO$_2$); (29) RI-DD-47 (100Fe/2Cu/5K$_2$O/0SiO$_2$); (30) RI-DD-48 (100Fe/2Cu/0K$_2$O/0SiO$_2$); (31) RI-DD-49 (100Fe/2Cu/0K$_2$O/0SiO$_2$); (32) RI-DD-50-(100Fe/5Cu/4K$_2$O/18SiO$_2$); (33) RI-DD-52 (100Fe/2Cu/5K$_2$O/12SiO$_2$/1 Pt); (34) RI-DD-53 (100Fe/2Cu/2.5K$_2$O/6SiO$_2$).

Figure 7:
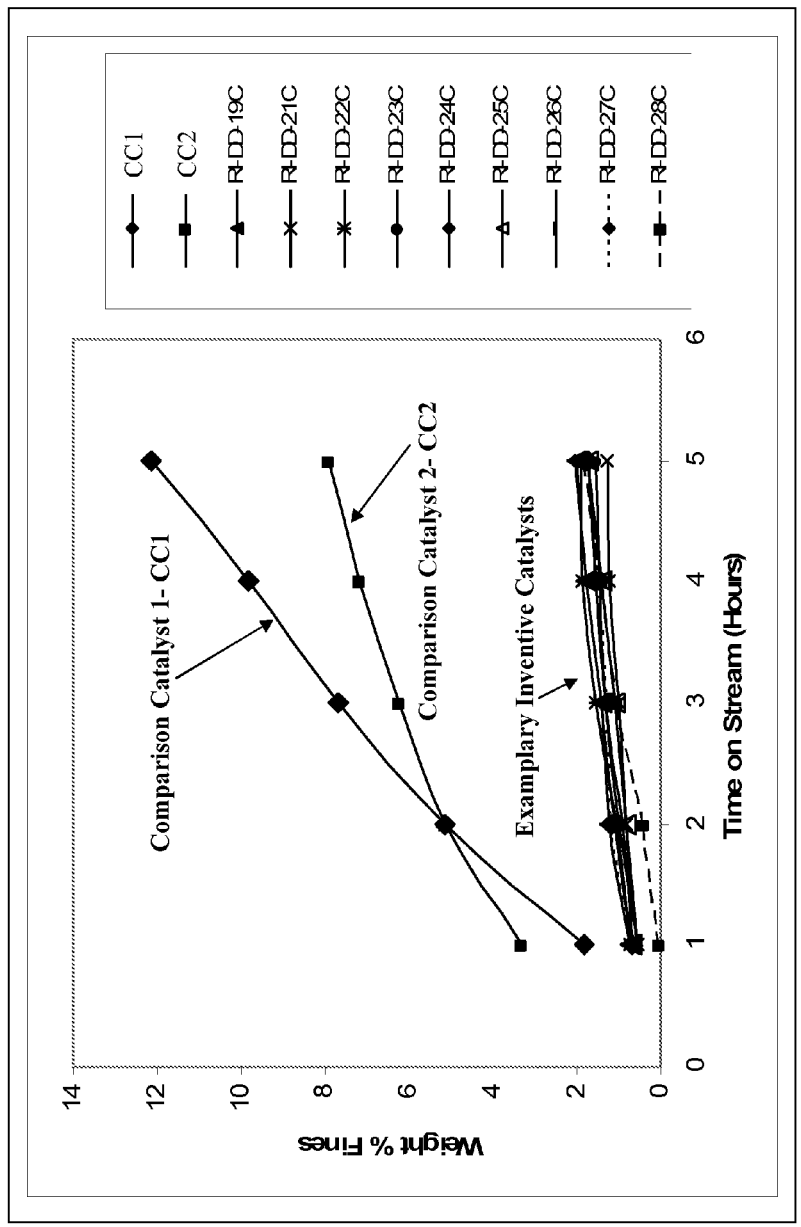
FIG. 7 is a plot of fines production (weight percent) as a function of time on stream (h) for calcined catalyst numbers 1 (RI-DD-19C), and 3-10 (RI-DD-21C to RI-DD-28C) in Example 1 hereinbelow.

FIG. 7 is a plot of weight percent fines as a function of time on stream for calcined catalysts (1) RI-DD-19C; (3) RI-DD-21C; (4) RI-DD-22C; (5) RI-DD-23C; (6) RI-DD-24C; (7) RI-DD-25C; (8) RI-DD-26C; (9) RI-DD-27C; (10) RI-DD-28C. Comparison catalysts CC1 and CC2 are unsupported (i.e., non-silica containing) precipitated iron catalysts, shown for comparison. CC1 and CC2 were formed using the method disclosed in U.S. Pat. No. 5,504,108, which is hereby incorporated herein by reference. As seen from FIG. 7, the inventive catalysts 1 and 3-10 exhibit significantly reduced fines production when compared to the prior art catalysts, producing less than 2.1 weight percent fines with 5 hours on stream.

Figure 8:
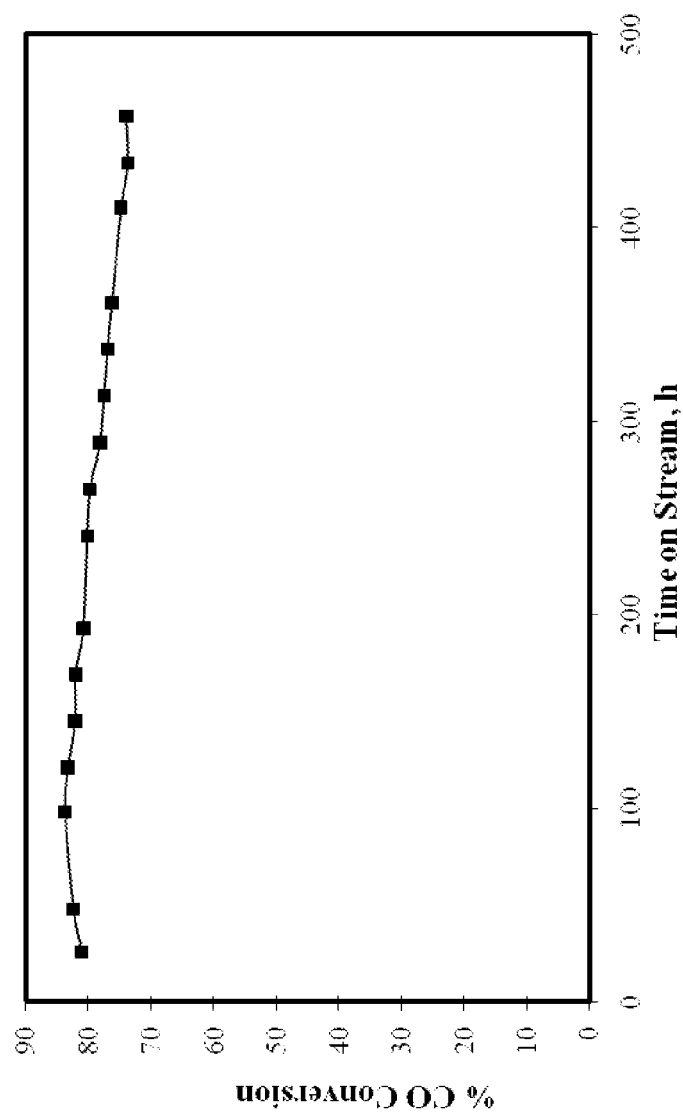
FIG. 8 is a plot of CO conversion (percent) as a function of time on stream (h) for Example catalyst number 34, RI-DD-53 in Example 1 hereinbelow.

FIG. 8 is a plot of CO conversion (percent) as a function of time on stream (hours) for catalyst number (34) RI-DD-53. The run was performed with 310.0 g of C-30 oil, 8.0 g of catalyst RI-DD-53. Activation was performed in synthesis gas having an $H_2$:CO ratio of 1, ramped from 150° C. to 270°

C. and 140 psig, and held for 10 hours. The space velocity (SV) during activation was 2.74NL/h/gFe (normal liters per hour per gram iron) with gradual transition to reaction. Reaction was carried out at 255° C., 375 psig, (1.874 standard liters per hour (slph) $N_2$, 9.528 slph CO, 7.336 slph $H_2$), space velocity of 3.70 NL/h/gFe. Flow rate of synthesis gas during reaction comprised an $H_2$:CO ratio of 0.77. As seen from FIG. 8, catalyst 34 provided better than 74% conversion of CO with 457 hours on stream.

Exchanging crystalline for fumed silica, as in catalysts (1) RI-DD-19, (3) RI-DD-21, (6) RI-DD-24, and (7) RI-DD-25, provided catalysts having smooth distribution of all promoters. Comparison catalyst RI-DD-11 was formed using crystalline silica. RI-DD-11 was formed by dissolving silicic acid in ammonium hydroxide; adding this solution to a suitable amount of KOH and stirring until the solution was clear, indicating substantially complete dissolution; portion by portion dissolving crystalline silica in the aforementioned solution; and using distilled water sparingly as needed to maintain a stirrable solution. RI-DD-11 had a composition of 100Fe/ 2.5K/12$SiO_2$/2.5Cu.

Fumed silica increases the BET surface area when compared with crystalline silica (catalyst (1) RI-DD-19 had a surface area of 109 $m^2$/g. While the addition of 5% silicic acid had little effect on the BET surface area of catalysts produced with fumed silica (245 $m^2$/g for catalyst (1) RI-DD-19 versus 247 $m^2$/g for catalyst (3) RI-DD-21), it appeared to provide significant improvement on the BET surface area of the crystalline systems (163 $m^2$/g for catalyst (2) RI-DD-20 versus 109 $m^2$/g for comparison catalyst RI-DD-11). The latter improvement could also be a consequence of the higher pH of promotion for the former system (pH 10 vs. pH 8). There is also an improvement evident in the pore volumes at 0.278 cc/g (catalyst (2) RI-DD-20) vs. 0.246 cc/g (comparison catalyst RI-DD-11), while the fumed systems indicate a decrease from 0.417 (catalyst (1) RI-DD-19) to 0.364 cc/g (catalyst (3) RI-DD-21) with a 5% addition of silicic acid.

Halving the crystalline silica content to 12SiO2/100Fe (catalyst (4) RI-DD-22) gave a slightly higher surface area (173 to 163 $m^2$/g) and better pore volume (0.3008 vs 0.278) than for the 24SiO2/100Fe system (catalyst (2) RI-DD-20). While a similar trend was visible for catalysts (6) RI-DD-24 versus catalyst (3) RI-DD-21 for the pore volume of fumed silica systems (0.378 versus 0.364 cc/g), it depicted lower surface area (221 versus 247 $m^2$/g).

For systems containing fumed silica only, the surface area of a 24 SiO2/100Fe system (catalyst (1) RI-DD-19) was significantly higher (245 versus 221$m^2$/g) than for a 12 SiO2/100Fe system (catalyst (5) RI-DD-23). The pore volume was slightly lower at 0.334 cc/g for catalyst RI-DD-23 versus 0.417 cc/g for catalyst RI-DD-19.

Fumed silica promoted systems had higher TPR peak temperature than that of crystalline silica systems; for example, catalyst (1) RI-DD-19 had a TPR peak temperature of 307° C. while comparison catalyst RI-DD-11 had a TPR peak temperature of 285° C. While the addition of 5 weight percent silicic acid appears to decrease this temperature (259° C. for catalyst (2) RI-DD-20 versus 285° C. for catalyst RI-DD-11, it has little effect on systems containing fumed silica; the TPR peak temperature was 307° C. for catalyst (1) RI-DD-19 and 298° C. for catalyst (3) RI-DD-21.

Attrition Study

The pH of the iron slurry during promoter addition, the use of fumed silica, and the addition of silicic acid had a significant impact on improving the attrition strength of the catalyst. The use of fumed silica over crystalline silica allowed a 50% improvement on strength, from 4% fines to 2% for the comparison catalyst RI-DD-11 and catalyst (1) RI-DD-19. Addition of 5 weight percent silicic acid further, significantly, improved the physical attrition strength to 2.6% (and 0.8) for crystalline systems (e.g., catalyst (2) RI-DD-20) and 1.3% (and 0.14) for fumed systems (catalyst (3) RI-DD-21). Chemical Attrition tests also showed a significant improvement in RCAI-20 and RCAI-10 strength over comparison CC2 catalysts at 1.18 and 0.40 (e.g., for catalyst (1) RI-DD-19), 0.64 and 0.10 (catalyst (3) RI-DD-21), as well as 0.55 and 0.30 (e.g., for catalyst (5) RI-DD-23) versus –10.5 and 2.2 for the comparison CC2 catalyst.

Halving the fumed silica content from 22 $SiO_2$/100 Fe (catalyst (1) RI-DD-19) to 12 $SiO_2$/100 Fe (catalyst (5) RI-DD-23) also appeared to significantly improve the catalyst. This is reflected both in the physical Air Jet (2.0% & 0.30 versus 1.65 and 0.12) and chemical attrition tests (1.18 & 0.40 versus 0.55 & 0.30). The pH of the iron slurry during promotion also appeared to significantly affect the strength of the catalyst. This is mostly attributed to the fact that the silica promoter is better distributed throughout the catalyst matrix at higher pH.

It was also found that the promoter addition sequence is important. If the silicic acid is directly co-added with fumed silica, a weaker system was produced than when added in two separate steps. It appears as if the polymeric chain of the silicic acid is in some way compromised when mixed with the potassium silicate solution. Consider a two step addition, i.e. the fumed silica solution and silicic acid solutions are added in two different steps to the iron slurry (RI-DD-21), and single step addition, i.e. the fumed silica and silicic acid solutions are prepared as a single solution and added in one step to the iron slurry (RI-DD-25). The latter showed weaker physical attrition strength at 1.74% (and 0.33) versus 1.3% (and 0.14). Increasing the calcination temperature from 300 to 380° C. did significantly improve the strength of the latter system (1.07% and 0.19), but it dramatically decreased the surface area from 242 $m^2$/g to 207 $m^2$/g. This may be considered as an additional strength optimization parameter to creating stronger catalysts.

In one instance the temperature of the iron slurry to be promoted was raised from room temperature to approx. 40° C. to evaluate if the promoter distribution could be improved even further, and hence the strength. It is assumed that the heated slurry will re-slurry more completely, and the promoters be distributed more homogeneously. The single result obtained (RI-DD-26) is not conclusive and gave rise to a system with strength between that of a two step and single step addition system (1.75% and 0.21).

Two systems, RI-DD-21C (two step 5% silicic acid-fumed silica 100 Fe/2Cu/5$K_2$O/22 $SiO_2$) and RI-DD-22C (two step 5% silicic acid-crystalline silica 100 Fe/2Cu/5$K_2$O/12$SiO_2$), indicated leveling off of breakup after the 4th hour of ASTM Air Jet testing.

Mixed Support Systems

In one case (catalyst (10) RI-DD-28) potassium water glass was evaluated. In another, mixtures of fumed silica and potassium water glass, and fumed silica and kaoline (catalyst (9) RI-DD-27) (a silica-alumina mixture) were evaluated. In another instance potassium water glass was mixed with kaoline (catalyst (16) RI-DD-34), and yet in another potassium waterglass and fumed silica (catalyst (12) RI-DD-30). The use of kaolinite (i.e. a mixture of $SiO_2$ and $Al_2O_3$) arises from the fact that geopolymer-like structures can be manufactured. These structures are very strong, providing a new type of catalyst support structure that may be beneficial to slurry catalytic systems.

Example 2

Catalysts Formed Using Iron-Copper Nitrate, Sodium Carbonate, and Various Sources of Silica Supported attrition resistant iron-based Fischer-Tropsch catalysts promoted with copper and potassium were formed using elemental iron as starting material. The experimental steps used in manufacturing the catalyst are listed hereafter and further described hereinbelow. The basic steps comprised: (1) preparation of iron and copper nitrate solution; (2) preparation of sodium carbonate solution; (3) preparation of promoter gel, (4) precipitation, (5) washing, (6) addition of promoter gel, (7) drying and sizing, and (8) calcining. A list of the catalysts produced is provided in Table 2.

Reagents

The basic components or reagents used in the manufacturing process include: (1) Iron Powder, Fe (Hoganas, 98.61% Fe, −325 mesh) 86.6 g; (2) Copper Metal, Cu (Alfa Aesar, 99.5% Cu, −40+100 mesh) 4.35 g; (3) Potassium Hydroxide, KOH (Sigma Aldrich) 9.90 g 45 wt. % in water; (4) Nitric Acid, 70% (Fisher) 432.44 g Certified ACS PLUS grade; (5) Sodium Carbonate, $Na_2CO_3$, 99.5+% 220.04 g ACS reagent grade—CAS 497-19-8; (6) Ammonium Hydroxide, $NH_4OH$ (EMO, 28-30%) 28.91 g ACS reagent grade; (7) CAB-O-SIL® Untreated Fumed Silica (Monson) 9.70 g Silicon Dioxide, Synthetic, Crystalline-Free; (8) Silicic acid; and (9) DI Water.

Manufacturing Procedure

In the procedure below items in normal text should be considered specifications and items in italics should be considered as guidelines.

(1). Iron powder, 86.6 g, and copper powder, 4.35 g, are slurried with 380 and 49 g of DI water respectively (*it actually helps to dissolve the copper separately, i.e. reslurry the iron powder in 380 ml DI and the copper powder in 49 ml DI*). The slurry helps to prevent hot spots due to exothermic reaction during the dissolution process.

(2). Nitric Acid, 432.44 g of 70% $HNO_3$, is dissolved in 1296 g DI water.

(3). With mechanical stirring, the nitric acid solution is added to the metal slurries drop wise (*i.e. use ~300 mL of the nitric acid solution to first dissolve the copper powder, 50 mL acid in first 2 min, then 50 mL over each following 5 min then add the copper nitrate solution drop wise to the iron powder-DI slurry, and then add the remaining nitric acid solution drop wise to the iron powder-DI slurry*). The addition rate is slow, max. 15-20 ml/min, such that the reaction temperature between 30° C.-32° C. (the temperature should not fall below 30° C., and not exceed 32° C.). This dissolution reaction is exothermic and the addition can be controlled based on reaction temperature. With intermittent cooling, when ~80% of the nitric acid is added a dark green solution is formed.

(4). The mixture is allowed to stir (high speed stirring) for approximately 15 minutes without heating.

(5). The iron nitrate—copper nitrate solution is then filtered to remove any undissolved material. [Take note: there will be approximately 130 mL excess iron-copper nitrate solution. This is to ensure that there is enough for complete precipitation with the sodium carbonate].

(6). The solution is then heated to 70° C. at ~3° C./minutes and maintained at 70° C. for 30 minutes. Just above 65° C., $NO_x$ gases with reddish-brown color are produced for several minutes. During this heating period the mixture will change color from a dark green to a red/brown color.

(7). An 80 g/L sodium carbonate solution, 220.04 g sodium carbonate+2750 g DI, is prepared and heated to 70° C.

(8). The 70° C. acid solution is added quickly to the 70° C. sodium carbonate solution (71.5° C.) over 10 minutes 30 sec while monitoring the pH of the solution. At pH 7.7 to 7.0, a foam head forms on top of the precipitate. Base addition is continued until a pH of 6.9±0.1 is achieved.

(9). Once a pH of 6.9±0.1 is achieved the slurry is immediately removed to the filter unit and washed with copious amount of hot condensate (±80° C.) until the pH=6 (conductivity was 19 μs/cm).

(10). The filter residue is dried sufficiently (vacuum dried for 10 minutes) so that it is easily removed from the filter paper, but not so that it is totally dry. The filtered residue should be slurried and spray dried as soon as possible, preferably in less than 24 hours. Obtain sample of filter cake.

(11). The solid is placed in a beaker of known weight. Reslurried to 17.3 wt % with ~2.6 g of DI water. pH is adjusted using 57.82 g ammonium hydroxide solution. Stirred for 15 minutes (pH=10.7). It is important that the pH is above pH 10 before continuing.

(12). The resultant mixture was then promoted with 57.43 g CAB-O-SIL® promoter solution (9.7 g fumed silica is slowly, in portions, added to the 9.9 g potassium hydroxide dissolved in 40 ml of DI water, ensuring it is well dispersed and no lumps are formed. The slurry is well mixed for 24 hours). Mixed for 15 minutes (pH=10.72).

(13). The mixture is spray dried to spherical particles with a normal size distribution between 40-100 microns (mean at approximately 80 microns). The Type H, Mobile Niro Spray Dryer consists of a two-fluid nozzle atomizer, drying chamber, air disperser, chamber, product collection section, air ducts, cyclone, exhaust fan, air heater, and instrument panel. The "feed" is introduced through a nozzle from the bottom with the drying air cross flowing from the top. The Inlet Temperature was about 370° C. (±2)° C.; the Outlet Temperature was about 79° C. (±3.0)° C.; the slurry Solids Content was in the range of from about 15 to about 20%; the Water Setup Flow was 4.0 to 4.5 kg/hr (feed flow is set with water, and then switched to actual feed slurry); and the Atomizer Air Flow was 1 bar with a 30% setting on a variable area flow meter.

(14). The spray dried samples are then calcined in a porcelain crucible as soon as possible to minimize aging. The material is calcined as follows: (1) increase from room temperature to 140° C. at 0.5° C./min., dwell for 4 hours at this temperature; (2) increase from room temperature to 200° C. at 0.5° C./min., dwell for 4 hours at this temperature; (3) increase from room temperature to 300° C. at 0.5° C./min., dwell for 4 hours at this temperature; and (4) decrease to room temperature.

Catalysts were formed via the above recipe, including the following catalysts, as shown in Table 2: (35) RI-DD-551 (100Fe/5Cu/5$K_2$O/22Si$O_2$); (36) RI-DD-551-2 (100Fe/5Cu/5$K_2$O/22Si$O_2$); (37) RI-DD-554 (100Fe/2Cu/5$K_2$O/12Si$O_2$); (38) RI-DD-555 (100Fe/2Cu/5$K_2$O/12Si$O_2$); (39) RI-DD-S56 (100Fe/2Cu/5$K_2$O/12Si$O_2$); (40) RI-DD-557 (100Fe/2Cu/5$K_2$O/12Si$O_2$); (41) RI-DD-558 (100Fe/5Cu/5$K_2$O/12Si$O_2$); (42) RI-DD-558-2 (100Fe/5Cu/5$K_2$O/12Si$O_2$); (43) RI-DD-559 (100Fe/5Cu/5$K_2$O/12Si$O_2$); (44) RI-DD-S60 (100Fe/5Cu/5$K_2$O/12Si$O_2$); and (45) RI-DD-S61 (100Fe/5Cu/5$K_2$O/17Si$O_2$).

Figure 9:
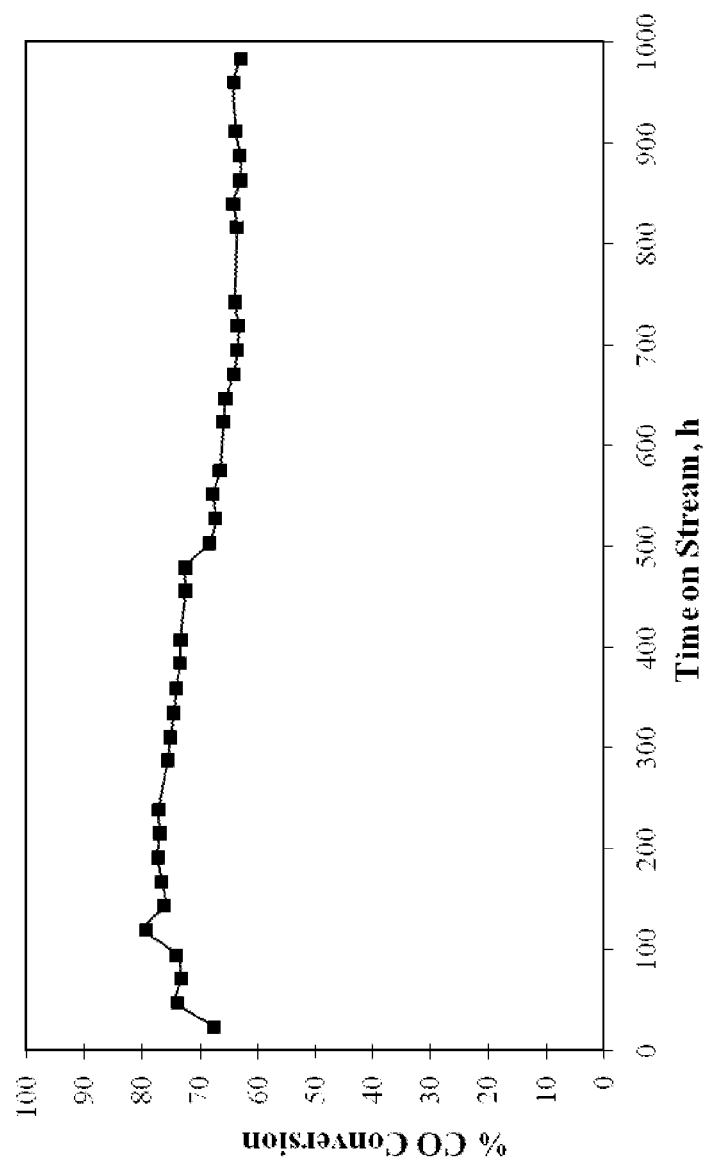
FIG. 9 is a plot of CO conversion (percent) as a function of time on stream (h) for Example catalyst number 45, RI-DD-S61 in Example 2 hereinbelow.

FIG. 9 is a plot of CO conversion (percent) as a function of time on stream (hours) for catalyst number 45—RI-DD-S61. The run was performed with 310 g of C-30 oil, 8.0 g of catalyst RI-DD-S61. Activation was performed in synthesis gas having an $H_2$:CO ratio of 1, ramped from 150° C. to 270° C. and 140 psig, and held for 10 hours. The space velocity (SV) during activation was 2.54NL/h/gFe (normal liters per hour per gram iron) with gradual transition to reaction. Reaction was carried out at 255° C., 375 psig, (1.868 standard liters per hour (slph) $N_2$, 9.499 slph CO, 7.313 slph $H_2$), space velocity of 3.4 NL/h/gFe. Flow rate of synthesis gas during reaction comprised an $H_2$:CO ratio of 0.77. As seen from FIG. 9, catalyst 45 provided better than 62% conversion of CO with 983 hours on stream and better than 72% conversion of CO with 479 hours on stream.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

TABLE 1

Base Recipe 1 Examples

| Sample | [1]Fe Powder, g | [2]Cu Metal, g | [3]Copper Nitrate, g | [4]KOH, g | [5]$HNO_3$, g (mL) | [6]$NH_4OH$, mL | [7]Cab-O-SiL ®, g | [8]Sil-Co-Sil ®, g | Silicic Acid | [9]Meta Max ®, g | $K_2O$, g | [10]$SiO_2$, g |
|---|---|---|---|---|---|---|---|---|---|---|---|---|
| (1) RI-DD-19 | 80.744 | 1.600 | — | 9.900 | 403.2 (288) | 290 | 17.65 | — | — | — | — | — |
| (2) RI-DD-20 | 80.744 | 1.600 | — | 9.900 | 403.2 | 290 | — | 13.9 | 4.9 | — | — | — |
| (3) RI-DD-21 | 80.744 | 1.600 | — | 9.900 | 403.2 | 290 | 13.9 | — | 4.9 | — | — | — |
| (4) RI-DD-22 | 80.744 | 1.600 | — | 9.900 | 403.2 | 290 | — | 5.9 | 4.9 | — | — | — |
| (5) RI-DD-23 | 80.744 | 1.600 | — | 9.900 | 403.2 | 290 | 9.7 | — | — | — | — | — |
| (6) RI-DD-24 | 80.744 | 1.600 | — | 9.900 | 403.2 | 290 | 5.9 | — | 4.9 | — | — | — |
| (7) RI-DD-25 | 80.744 | 1.600 | — | 9.900 | 403.2 | 290 | 13.9 | — | 4.9 | — | — | — |
| (8) RI-DD-26 | 80.744 | 1.600 | — | 9.900 | 403.2 | 290 | 13.9 | — | 4.9 | — | — | — |
| (9) RI-DD-27 | 80.744 | 1.600 | — | 9.900 | 403.2 | 290 | 9.3 | — | — | 10 | — | — |
| (10) RI-DD-28 | 80.744 | 1.600 | — | — | 403.2 | 290 | — | — | — | — | 7.19 | 17.79 |
| (11) RI-DD-29 | 80.744 | 1.600 | — | 9.900 | 403.2 | 290 | — | 17.65 | — | — | — | — |
| (12) RI-DD-30 | 80.744 | 1.600 | — | 6.500 | 403.2 | 290 | 14.0 | — | — | — | 1.62 | 4.04 |
| (13) RI-DD-31 | 80.744 | 4.100 | — | 9.900 | 403.2 | 290 | 14.0 | — | — | — | — | — |
| (14) RI-DD-32 | 80.744 | 4.100 | — | 9.900 | 403.2 | 290 | 13.9 | — | 4.9 | — | — | — |
| (15) RI-DD-33 | 80.744 | — | 14.800 | 9.900 | 403.2 | 290 | 13.9 | — | 4.9 | — | — | — |
| (16) RI-DD-34 | 80.744 | — | 15.400 | 6.500 | 403.2 | 290 | 13.9 | — | — | 14.8 | — | 4.04 |
| (17) RI-DD-35 | 80.744 | — | 15.400 | 6.500 | 403.2 | 290 | 13.9 | — | — | 14.8 | — | 4.04 |
| (18) RI-DD-36 | 80.744 | — | 15.400 | 9.000 | 403.2 | 290 | 13.9 | — | — | 14.8 | — | 4.04 |
| (19) RI-DD-37 | 80.744 | 1.600 | — | 9.900 | 403.2 | 290 | 9.7 | — | — | — | — | — |
| (20) RI-DD-38 | 80.744 | — | 6.290 | 9.900 | 403.2 | 290 | 9.7 | — | — | — | — | — |
| (21) RI-DD-39 | 80.744 | — | 7.200 | 19.47 | 403.2 | 290 | 9.7 | — | — | — | — | — |
| (22) RI-DD-40 | 80.744 | — | 18.500 | 34.500 | 403.2 | 290 | 13.90 | — | 4.9 | — | — | — |
| (23) RI-DD-41 | 80.744 | 1.600 | — | 9.900 | 403.2 | 290 | 17.700 | — | — | — | — | — |
| (24) RI-DD-42 | 80.744 | 1.600 | — | 9.900 | 403.2 | 290 | 13.90 | — | 4.9 | — | — | — |
| (25) RI-DD-43 | 80.744 | — | 6.200 | 9.900 | 403.2 | 290 | 9.7 | — | — | — | — | — |
| (26) RI-DD-44 | 80.744 | 1.600 | — | 9.900 | 403.2 | 290 | 9.7 | — | — | — | — | — |
| (27) RI-DD-45 | 80.744 | 1.600 | — | 9.900 | 403.2 | 290 | 9.7 | — | — | — | — | — |
| (28) RI-DD-46 | 80.744 | 1.600 | — | 9.900 | 403.2 | 290 | 4.9 | — | — | — | — | — |
| (29) RI-DD-47 | 80.744 | 1.600 | — | 9.900 | 403.2 | 300 | — | — | — | — | — | — |
| (30) RI-DD-48 | 80.744 | 1.600 | — | — | 403.2 | 300 | — | — | — | — | — | — |
| (31) RI-DD-49 | 80.744 | 1.600 | — | — | 403.2 | 300 | — | — | — | — | — | — |
| (32) RI-DD-50 | 80.744 | 4.100 | — | 9.900 | 403.2 | 300 | 13.90 | — | 4.9 | — | — | — |
| (33)[11] RI-DD-52 | 80.744 | 1.600 | — | 9.900 | 403.2 | 300 | 9.7 | — | 4.9 | — | — | — |
| (34)[11] RI-DD-53 | 80.744 | 1.600 | — | 9.900 | 403.2 | 300 | 9.7 | — | — | — | — | — |

[1]Hoganas, 98.61% Fe, −325 mesh
[2]Alfa Aesar, 99.5% Cu, −40 + 100 mesh
[3]$Cu(NO_3)_2 \cdot 3H_2O$
[4]KOH, Sigma Aldrich, 45 weight % in water
[5]Fisher, 70%, Certified ACS Reagent Grade
[6]$NH_4OH$, EMO, 28-30%, ACS Reagent Grade
[7]Untreated Fumed Silica, Monson; silicon dioxide synthetic, crystalline free; colloidal silica
[8]Ground Silica; crystalline
[9]BASF; high reactivity metakaolin; natural pozzolan; similar to silica fume, but larger particle size
[10]Silicon Dioxide, Synthetic, Crystalline-Free
[11]Also contains 2.0 g $Pt(NH_3)_4(NO_3)_2$

TABLE 2

Base Recipe 2 Examples

| Sample | [1]Fe Powder, g | [2]Cu Metal, g | [3]KOH, g | [4]HNO$_3$, g (mL) | [5]Na$_2$CO$_3$, g | [6]NH$_4$OH, mL | [7]Cab-O-SiL ®, g | Silicic Acid |
|---|---|---|---|---|---|---|---|---|
| (35) RI-DD-S51 | 20.18 | 1.00 | — | 100.8 | 16.1 | — | — | — |
| (36) RI-DD-S51b | 20.18 | 1.00 | 9.90 | 100.8 | 31.0 | 12.5 | 13.9 | 4.9 |
| (37) RI-DD-S54 | 80.7 | 1.60 | 9.90 | 403.2 | 182.65 | 30.00 | 9.7 | — |
| (38) RI-DD-S55 | 80.7 | 1.60 | 9.90 | 403.2 | 182.65 | 26.5 | 9.7 | — |
| (39) RI-DD-S56 | 80.7 | 1.60 | 9.90 | 403.2 | 195.0 | 28.0 | 9.7 | — |
| (40) RI-DD-S57 | 86.6 | 1.80 | 9.90 | 432.44 | 216.9 | 58.7 | 9.7 | — |
| (41) RI-DD-S58 | 86.6 | 4.35 | 9.90 | 432.44 | 220.04 | 29.765 | 9.7 | — |
| (42) RI-DD-S58b | 86.6 | 4.35 | 9.90 | 432.44 | 220.04 | 30.07 | 9.7 | — |
| (43) RI-DD-S59 | 86.6 | 4.35 | 9.90 | 432.44 | 220.04 | 30.35 | 9.7 | — |
| (44) RI-DD-S60 | 86.6 | 4.35 | 9.90 | 432.44 | 220.04 | 28.91 | 9.7 | — |
| (45) RI-DD-S61 | 86.6 | 4.35 | 9.90 | 432.44 | 220.04 | 29.745 | 9.7 | — |

[1]Hoganas, 98.61% Fe, −325 mesh
[2]Alfa Aesar, 99.5% Cu, −40 + 100 mesh
[3]KOH, Sigma Aldrich, 45 weight % in water
[4]Fisher, 70%, Certified ACS Reagent Grade
[5]99.5+%, ACS Reagent Grade-CAS 497-19-8
[6]NH$_4$OH, EMO, 28-30%, ACS Reagent Grade
[7]Untreated Fumed Silica, Monson; silicon dioxide, synthetic, crystalline free; colloidal silica

TABLE 3

Compositions of Example Catalysts Studied

| Composition of Promoted Catalyst | Catalyst Numbers |
|---|---|
| 100Fe/5Cu/7K/11Si | (1) RI-DD-19, (2) RI-DD-20, (3) RI-DD-21 |
| 100Fe/5Cu/7K/6Si | (4) RI-DD-22, (5) RI-DD-23 |
| 100Fe/2Cu/5K$_2$O/12SiO$_2$ | (6) RI-DD-24, (19) RI-DD-37, (20) RI-DD-38, (21) RI-DD-39, (26) RI-DD-44, (27) RI-DD-45, (37) RI-DD-S54, (38) RI-DD-S55, (39) RI-DD-S56, (40) RI-DD-S57 |
| 100Fe/2Cu/5K$_2$O/22SiO$_2$ | (7) RI-DD-25, (8) RI-DD-26, (10) RI-DD-28, (11) RI-DD-29, (12) RI-DD-30, (23) RI-DD-41, (24) RI-DD-42 |
| 100Fe/2Cu/5K$_2$O/5Al$_2$O$_3$/18SiO$_2$ = 100Fe/12 METAMAX ® | (9) RI-DD-27 |
| 100Fe/5Cu/5K$_2$O/22SiO$_2$ | (13) RI-DD-31, (14) RI-DD-32, (15) RI-DD-33, (17) RI-DD-35, (18) RI-DD-36, (22) RI-DD-40, (35) RI-DD-S51, (36) RI-DD-S51b |
| 100Fe/5Cu/5K$_2$O/8Al$_2$O$_3$/15SiO$_2$ = 100Fe/18 METAMAX ® | (16) RI-DD-34 |
| 100Fe/26Cu/5K$_2$O/12SiO$_2$ | (25) RI-DD-43 |
| 100Fe/2Cu/5K$_2$O/6SiO$_2$ | (28) RI-DD-46 |
| 100Fe/2Cu/5K$_2$O/0SiO$_2$ | (29) RI-DD-47 |
| 100Fe/2Cu/0K$_2$O/0SiO$_2$ | (30) RI-DD-48, (31) RI-DD-49 |
| 100Fe/5Cu/4K$_2$O/18SiO$_2$ | (32) RI-DD-50 |
| 100Fe/2Cu/5K$_2$O/12SiO$_2$/1Pt | (33) RI-DD-52 |
| 100Fe/5Cu/2.5K$_2$O/6SiO$_2$/1Pt | (34) RI-DD-53 |
| 100Fe/5Cu/5K$_2$O/12SiO$_2$ | (41) RI-DD-S58, (42) RI-DD-S58b, (43) RI-DD-S59, (44) RI-DD-S60 |
| 100Fe/5Cu/5K$_2$O/17SiO$_2$ | (45) RI-DD-S61 |

What is claimed is:

1. A structurally promoted, precipitated, Fischer-Tropsch catalyst that exhibits an RCAI-10 in the range of from about 0 to about 2.8, produced by a method comprising:
    preparing a nitrate solution, wherein preparing comprises forming at least one metal slurry and combining the at least one metal slurry with a nitric acid solution;
    combining the nitrate solution with a basic solution to form a precipitate;
    structurally promoting the precipitate with at least one source of silicon to form a promoted mixture, wherein promoting comprises combining the precipitate with (a) silicic acid and one or more component selected from the group consisting of non-crystalline silicas, crystalline silicas, and sources of kaolin or (b) at least one component selected from the group consisting of non-crystalline silicas and sources of kaolin, in the absence of silicic acid; and
    spray drying the promoted mixture to produce a spray-dried catalyst having a particle size.

2. The Fischer-Tropsch catalyst of claim 1 exhibiting an RCAI-20 in the range of from about 0 to about 4.3.

3. The Fischer-Tropsch catalyst of claim 1 comprising iron, obtained by preparation of the nitrate solution with an iron slurry, and having a weight ratio of Fe:SiO$_2$ in the range of from about 100:5 to 100:25.

4. The Fischer-Tropsch catalyst of claim 3 further comprising potassium, obtained by incorporation thereof via double promotion of the precipitate, including chemical promotion with a source of potassium and structural promotion via (a) or (b), and having a weight ratio of Fe:K in the range of from about 100:2 to 100:5.

5. The Fischer-Tropsch catalyst of claim 4 wherein the source of potassium is selected from the group consisting of KOH, $K_2O$, and combinations thereof.

6. The Fischer-Tropsch of claim 3 wherein promoting comprises combining the precipitate with (a) silicic acid and one or more component selected from the group consisting of non-crystalline silicas, crystalline silicas, and sources of kaolin, and wherein the source of silicon comprises up to or equal to about 5 weight percent silicic acid.

7. The Fischer-Tropsch catalyst of claim 6 wherein promoting comprises combining the precipitate with silicic acid and at least one non-crystalline silica.

8. The Fischer-Tropsch catalyst of claim 7 wherein the at least one non-crystalline silica is selected from the group consisting of fumed silicas.

9. The Fischer-Tropsch catalyst of claim 7 wherein promoting comprises combining the precipitate with silicic acid, at least one non-crystalline silica, and at least one source of kaolin.

10. The Fischer-Tropsch catalyst of claim 6 wherein promoting comprises combining the precipitate with silicic acid and at least one crystalline silica.

11. The Fischer-Tropsch catalyst of claim 10 wherein promoting comprises combining the precipitate with silicic acid, at least one crystalline silica, and at least one source of kaolin.

12. The Fischer-Tropsch catalyst of claim 6 wherein promoting comprises combining the precipitate with silicic acid, at least one crystalline silica, at least one non-crystalline silica, and at least one source of kaolin.

13. The Fischer-Tropsch catalyst of claim 1 comprising iron and copper, obtained by preparation of the nitrate solution with a metal slurry comprising iron and copper, a metal slurry comprising iron and a metal slurry comprising copper, or both, and having a weight ratio of $Fe:SiO_2$ in the range of from about 100:5 to 100:25, and a weight ratio of Fe:Cu in the range of from about 100:2 to about 100:5.

14. The Fischer-Tropsch catalyst of claim 1 wherein promoting comprises combining the precipitate with (b) at least one component selected from the group consisting of non-crystalline silicas and sources of kaolin, in the absence of silicic acid.

15. The Fischer-Tropsch catalyst of claim 14 wherein promoting comprises combining the precipitate with at least one non-crystalline silica, in the absence of silicic acid.

16. The Fischer-Tropsch catalyst of claim 15 wherein the non-crystalline silica is selected from fumed silicas.

17. The Fischer-Tropsch catalyst of claim 14 wherein promoting comprises combining the precipitate with at least one source of kaolin, in the absence of silicic acid.

18. The Fischer-Tropsch catalyst of claim 14 wherein promoting comprises combining the precipitate with at least one non-crystalline silica and at least one source of kaolin, in the absence of silicic acid.

19. The Fischer-Tropsch catalyst of claim 1 wherein the basic solution comprises at least one selected from the group consisting of sodium carbonate and ammonium hydroxide.

20. The Fischer-Tropsch catalyst of claim 1 wherein the spray-dried catalyst is substantially spherical, and wherein the particle size is in the range of from about 40 to about 100 micrometers.

21. The Fischer-Tropsch catalyst of claim 1, wherein the method further comprises:
filtering to remove liquids from the precipitate and form a filter residue, reslurrying the filter residue, and combining the reslurried residue with (a) or (b), wherein the reslurried residue has a pH of greater than or equal to about 10, enabling superior dissolution of the structural promoters of (a) or (b).

22. The Fischer-Tropsch catalyst of 1 wherein, upon calcination, the calcined catalyst has a surface area of at least 70 $m^2/g$, a pore volume in the range of from about 0.2 and 0.3, an average pore size in the range of from 50 and 78 Å, or a combination thereof.

23. The Fischer-Tropsch catalyst of claim 1 comprising a substantially homogeneous distribution of structural promoter, provided via structural promotion of (a) or (b) at a pH of greater than or equal to about 10.

24. The Fischer-Tropsch catalyst of claim 1 further comprising platinum, obtained by incorporation thereof during structural promotion, wherein the weight ratio of Fe:Pt in the Fischer-Tropsch catalyst is in the range of from about 100:1 to about 100:2.

25. The Fischer-Tropsch catalyst of claim 1 that produces less than about 6 weight percent fines after 5 hours ASTM Air Jet Attrition testing.

26. A structurally promoted, precipitated, Fischer-Tropsch catalyst that produces less than 6 weight percent fines after 5 hours ASTM Air Jet Attrition testing, due to formation via:
preparing a nitrate solution, wherein preparing comprises forming at least one metal slurry and combining the at least one metal slurry with a nitric acid solution;
combining the nitrate solution with a basic solution to form a precipitate;
structurally promoting the precipitate with at least one source of silicon to form a promoted mixture, wherein promoting comprises combining the precipitate with (a) silicic acid and one or more component selected from the group consisting of non-crystalline silicas, crystalline silicas, and sources of kaolin or (b) at least one component selected from the group consisting of non-crystalline silicas and sources of kaolin, in the absence of silicic acid; and
spray drying the promoted mixture to produce a spray-dried catalyst having a particle size.

27. The Fischer-Tropsch catalyst of claim 26, that produces less than 4, 3.4, 3, 2, or 1.3 weight percent fines after 5 hours ASTM Air Jet Attrition testing.

28. The Fischer-Tropsch catalyst of claim 26 wherein promoting comprises combining the precipitate with (a) silicic acid and one or more component selected from the group consisting of non-crystalline silicas, crystalline silicas, and sources of kaolin, and wherein the source of silicon comprises up to or equal to about 5 weight percent silicic acid.

29. The Fischer-Tropsch catalyst of claim 28 wherein enhanced physical attrition resistance thereof is provided by a multi-step structural promotion, wherein the silicic acid is added to the precipitate separately from any other source of silicon, relative to a Fischer-Tropsch catalyst in which the silicic acid is added in the same step as any other source of silicon.

30. The Fischer-Tropsch catalyst of claim 28 having a main reduction peak temperature in the range of from about 204° C. and 259° C.

31. The Fischer-Tropsch catalyst of claim 26 comprising iron, obtained by preparation of the nitrate solution with an iron slurry, and having a weight ratio of $Fe:SiO_2$ in the range of from about 100:6 to 100:24.

32. The Fischer-Tropsch catalyst of claim 31 having a BET surface area in the range of from about 144 $m^2/g$ to about 237 $m^2/g$.

33. The Fischer-Tropsch catalyst of claim 32 having a pore volume in the range of from about 0.2 to about 0.3.

34. The Fischer-Tropsch catalyst of claim 33 having an average pore size in the range of from 50 and 78 Å.

35. The Fischer-Tropsch catalyst of claim 26 comprising a substantially homogeneous distribution of structural promoter, provided by structural promotion of (a) or (b) at a pH of greater than or equal to about 10.

36. The Fischer-Tropsch catalyst of claim 26 formed by precipitation with basic solution comprising sodium carbonate.

37. A structurally promoted, precipitated Fischer-Tropsch catalyst comprising a weight ratio of Fe:$SiO_2$ in the range of from about 100:5 to about 100:25, a weight ratio of Fe:K in the range of from about 100:2 to about 100:5, and a weight ratio of Fe:Cu in the range of from about 100:2 to about 100:5, wherein silicon is incorporated into the catalyst by structural promotion of an iron-based catalyst precipitate with up to 5 weight percent silicic acid, with any balance of the silicon in the catalyst being incorporated by structural promotion with another silicon source selected from the group consisting of non-crystalline silicas, crystalline silicas, and sources of kaolin.

38. The Fischer-Tropsch catalyst of claim 37 wherein the balance of the silicon in the catalyst is provided by one or more non-crystalline silicon source.

39. The Fischer-Tropsch catalyst of claim 37 comprising a substantially homogeneous distribution of silicon structural promoter, provided by structural promotion at a pH of greater than or equal to about 10.

40. The Fischer-Tropsch catalyst of claim 37 wherein enhanced physical attrition resistance thereof is provided by a multi-step structural promotion, wherein the silicic acid is added to the iron catalyst precipitate separately from any other source of silicon, relative to a Fischer-Tropsch catalyst in which the silicic acid is added in the same step as any other source of silicon.

41. The Fischer-Tropsch catalyst of claim 37 having a main reduction peak temperature in the range of from about 204° C. and 259° C.

42. The Fischer-Tropsch catalyst of claim 37 that produces less than about 6 weight percent fines after 5 hours ASTM Air Jet Attrition testing.

* * * * *